United States Patent
Tanaka et al.

(10) Patent No.: US 7,577,770 B2
(45) Date of Patent: Aug. 18, 2009

(54) SYSTEM AND METHOD FOR PERFORMANCE MONITORING AND RECONFIGURING COMPUTER SYSTEM WITH HARDWARE MONITOR

(75) Inventors: Tsuyoshi Tanaka, Kokubunji (JP); Yoshiki Murakami, Hadano (JP)

(73) Assignee: Hitachi, Ltd., Tokyo (JP)

(*) Notice: Subject to any disclaimer, the term of this patent is extended or adjusted under 35 U.S.C. 154(b) by 103 days.

(21) Appl. No.: 11/771,397

(22) Filed: Jun. 29, 2007

(65) Prior Publication Data
US 2008/0071939 A1    Mar. 20, 2008

(30) Foreign Application Priority Data
Sep. 15, 2006    (JP)    ............................. 2006-250645

(51) Int. Cl.
*G06F 3/00*    (2006.01)
(52) U.S. Cl. ................. 710/18; 710/8; 710/14; 710/15; 710/16; 710/17; 718/101; 718/102
(58) Field of Classification Search ........... 710/8, 710/14–18; 718/101, 102
See application file for complete search history.

(56) References Cited

U.S. PATENT DOCUMENTS 5,872,972 A * 2/1999 Boland et al. ............... 718/102
6,092,180 A   7/2000 Anderson et al.

OTHER PUBLICATIONS

"System Performance Tuning", 2nd ed. Musumeci, Gian-Paolo D. and Loukides, Mike. O'Reilly Media, Inc., 2003.
"High Performance Client Server: A Guide to Building and Managing Robust Distributed Systems", Loosely, Chris and Douglas, Frank. John Wiley & Sons Inc., 1998, (Japanese translation title: "256 Rules of Database Tuning", Nikkei Business Publications, Inc., 1999).

* cited by examiner

*Primary Examiner*—Tammara Peyton
(74) *Attorney, Agent, or Firm*—Brundidge & Stanger, P.C.

(57) ABSTRACT

A judgment is made quickly about whether or not it is a memory or a chipset that is causing a performance bottleneck in an application program. A computer system of this invention includes at least one CPU, a controller that connects the CPU to a memory and to an I/O interface, in which the controller includes a response time measuring unit, which receives a request to access the memory and measures a response time taken to respond to the memory access request, a frequency counting unit, which measures an issue count of the memory access request, a measurement result storing unit, which stores a measurement result associating the response time with the corresponding issue count, and a measurement result control unit which outputs the measurement result stored in the measurement result storing unit when receiving a measurement result read request.

12 Claims, 26 Drawing Sheets

Beginning of a latency measurement

Ending of a latency measurement

|  | Local | Remote |
|---|---|---|
| Locality | High (3) | Low (1) |
| Load | Heavy | Light |

FIG. 15

| SYSTEM CONFIGURATION ||
| --- | --- |
| NODE COUNT OR BLADE COUNT | MEMORY ACCESS MODE |
| 1 | - |
| 2 | NUMA |
| 2 | INTERLEAVE |
| 3 | NUMA |
| 3 | INTERLEAVE |
| 4 | NUMA |
| 4 | INTERLEAVE |

FIG. 17

| PREMISE | | SUGGESTED CHANGE |
|---|---|---|
| ARCHITECTURE | MEMORY ACCESS CHARACTERISTICS | |
| NUMA | FREQUENT ACCESS (LOCAL,REMOTE) | INCREASE DIMM IN NUMBER TO RAISE MEMORY CHANNEL COUNT. OR SWITCH TO INTERLEAVE MODE. |
| INTERLEAVE | FREQUENT ACCESS (LOCAL,REMOTE) | INCREASE DIMM IN NUMBER TO RAISE MEMORY CHANNEL COUNT. OR ADD NODE/BLADE TO INCREASE NODE/BLADE CONSTITUTING SMP IN NUMBER. |
| NUMA | FREQUENT REMOTE ACCESS | ON A PROCESS/THREAD BASIS, FIX PROGRAM OPERATION LOCATION TO CPU OF NODE/BLADE IN WHICH MEMORY SECURED TO OS IS PLACED |
| NUMA | LOCAL ACCESS > REMOTE ACCESS | SWITCH TO CLUSTER CONFIGURATION IF PROGRAM CAN HANDLE SWITCH TO CLUSTER SYSTEM |
| CLUSTER | FREQUENT ACCESS (LOCAL,REMOTE) | INCREASE DIMM IN NUMBER TO RAISE MEMORY CHANNEL COUNT, OR SWITCH TO INTERLEAVE MODE OF SMP CONFIGURATION TO RAISE INTERLEAVE COUNT OF MEMORY |

*FIG. 19*

| OBSERVATION RANGE [CYCLE] | MEASUREMENT RANGE [CYCLE] | SHIFT WIDTH [bit] | UPPER BOUND (UPPER BOUND) (40bit) |
|---|---|---|---|
| 0~127 | 1 | 0 | 00000000_00000000_00000000_00000000_01111111 |
| 0~255 | 2 | 1 | 00000000_00000000_00000000_00000000_11111111 |
| 0~511 | 4 | 2 | 00000000_00000000_00000000_00000001_11111111 |
| 0~1023 | 8 | 3 | 00000000_00000000_00000000_00000011_11111111 |
| 0~2047 | 16 | 4 | 00000000_00000000_00000000_00000111_11111111 |
| 0~30767 | 256 | 8 | 00000000_00000000_00000000_01111111_11111111 |
| 0~8388607 | 65536 | 16 | 00000000_00000000_01111111_11111111_11111111 |

VALUES REGISTERED IN RANGE REGISTER

FIG. 24

| BS | UB | SELECT |
|---|---|---|
| 0 | 0 | A |
| 0 | 1 | B |
| 1 | 0 | C |
| 1 | 1 | DON'T CARE |

*FIG. 25*

SYSTEM AND METHOD FOR PERFORMANCE MONITORING AND RECONFIGURING COMPUTER SYSTEM WITH HARDWARE MONITOR

CLAIM OF PRIORITY

The present application claims priority from Japanese application P2006-250645 filed on Sep. 15, 2006, the content of which is hereby incorporated by reference into this application.

BACKGROUND OF THE INVENTION

This invention relates to a computer system with a hardware monitor, in particular, a performance evaluation system that evaluates the performance from information collected by the hardware monitor, as well as a computer system that restructures the hardware configuration according to the result of the performance evaluation.

The first step of performance tuning in computer systems such as database servers and application servers is to analyze performance bottleneck. In a common method for analyzing performance bottleneck, bottleneck locations are identified comprehensively based on the CPU utilization ratio, the CPU queue length, memory paging, swapping, the I/O throughput, and other data obtained by a performance monitor in an OS or the like, as described in "System Performance Tuning", 2nd ed. Musumeci, Gian-Paolo D. and Loukides, Mike. O'Reilly Media, Inc., (Japanese translation title: "UNIX System Performance Tuning", O'Reilly Japan, Inc., 2003), and in "High Performance Client Server: A Guide to Building and Managing Robust Distributed Systems", Looseley, Chris and Douglas, Frank. John Wiley & Sons Inc., 1998, (Japanese translation title: "256 Rules of Database Tuning", Nikkei Business Publications, Inc., 1999).

The throughput in transaction processing of a server is calculated commonly by the following formula:

(Throughput performance)=(CPU count×CPU frequency×constant)/(CPU execution step count×CPI)

The above constant refers to a number for converting the throughput value into per-unit hour throughput or per-unit second throughput. CPI is the count of execution cycles per instruction of a CPU. The performance can be improved by increasing the CPU count and the CPU frequency while reducing the execution step count and CPI.

CPI is calculated by the following formula:

CPI=CPI0+(L1 cache miss ratio−L2 cache miss ratio)×(memory latency of L2 cache)×Kc+(L2 cache miss ratio)×(memory latency of main memory)×Km where CPI0 represents the count of execution cycles per instruction when the L1 cache has an infinite capacity, and Kc and Km represent constant values for offsetting the effects of multiple memory access.

As mentioned above, the performance can be improved by increasing the CPU count and the CPU frequency, which are determined by how many CPUs are in the server and how many of the CPUs are put to use. A conventional way to reduce the CPU execution step count is well-thought out coding, or code optimization by a compiler.

A technique of reducing CPI has been proposed which uses a compiler or a CPU's instruction scheduler to increase the degree of parallel instruction execution. However, it is a known fact that some combination of workload and main memory latency can change the performance drastically since the memory latency varies depending on the system operation state and the hardware configuration.

As an alternative to the technique, an instruction scheduling method is being considered which uses measurement results of the memory latency (see U.S. Pat. No. 6,092,180, for example). In this method, the memory latencies of instructions executed by a processor are sampled to record the relation between an instruction and its memory latency. The instruction scheduler changes the order of executing instructions such that an instruction that has a long memory latency is executed before other instructions as much as possible. The instruction scheduler may instead determine where to insert a pre-fetch instruction. This method makes it possible to tune to the memory latency of a server in which the program is run, and to effectively use the CPU time, which is one of hardware resources.

SUMMARY OF THE INVENTION

However, methods that use the performance monitor of the OS as those described above have a problem in that whether hardware is causing a performance bottleneck cannot be observed directly. A possible solution to the performance change due to some combination of workload and main memory latency is to equip the CPU with a performance monitor, so that coding is optimized manually by conducting an instruction level analysis on data measured by the hardware monitor which includes the cache miss ratio and the average length of time of stalling resulting from a cache miss along an instruction pipeline.

This solution is applicable only to compilers and CPUs, and cannot be applied to chipsets and other components of a server.

Furthermore, identification of a performance bottleneck location through coding optimization in the manner described above is generally difficult in a system where an application program distributed or purchased as executable binary code is run and, accordingly, tuning on the code level is impossible.

Servers and other similar computers often use a multiprocessor in which multiple CPUs are packaged. Computers with a small number of CPUs are short in memory latency, but in most cases employ a cluster system which puts in multiple servers to improve the performance, because the performance of such computers cannot be brought to a sufficient level with a multi-process or multi-thread application program, a typical example of which is the Online Transaction Processing (OLTP) system. On the other hand, computers with many CPUs can improve their performance scalably in proportion to the load by employing a multi-process application program, while their hardware, which is complicate due to the necessity to maintain cache memory coherency among those many CPUs, tends to prolong the memory latency. This sometimes makes the performance of small-scale servers with a few CPUs higher than that of large-scale servers when application programs employed have the same process or the same thread count. There is a problem in that determining which type of computer to use, large-scale or small-scale, requires an evaluation process that takes a lot of steps including a scalability evaluation in which an actual service application program or a standard benchmark program is put into operation.

This invention has been made in view of the above problems, and a first object of this invention is to quickly judge whether or not it is a memory or a chipset that is causing a performance bottleneck in a CPU that has an unchangeable internal configuration or in an application program that does not allow coding optimization.

A second object of this invention is to avoid applying an additional load for evaluation to a measurement target system by preventing software that collects performance information of a computer such as a server from taking a CPU time or other resources that are allocated to a measurement target application program while collecting the performance information.

A third object of this invention is to automatically suggest a system configuration suitable to a workload that is required by an actual application program to an administrator of the system with a measured memory latency as the reference.

A computer system according to this invention includes: at least one CPU; and a controller for connecting the CPU to a memory and to an I/O interface, in which the controller includes: a response time measuring unit for receiving a request to access the memory and measuring a response time taken to respond to the memory access request; a frequency counting unit for measuring an issue count of the memory access request; a measurement result storing unit for storing a measurement result associating the response time with the corresponding issue count; and a measurement result control unit for outputting the measurement result from the measurement result storing unit when receiving a request to read the measurement result.

Further, in the computer according to this invention a management terminal estimates memory access characteristics from the memory access request response time and a memory access request issue count that is associated with the response time, based on the measurement result obtained from the measurement result control unit.

According to this invention, a controller placed between a memory and a CPU can measure the memory latency (response time) in association with the frequency of memory access requests, and a performance measurement can be carried out without applying a load for the performance measurement to the CPU. From the result of the measurement, a judgment can be made quickly about whether or not it is the memory or a chipset (the controller) that is causing a performance bottleneck in the CPU having an unchangeable internal configuration or in an application program that does not allow coding optimization.

This invention also provides assistance to an administrator of a computer system that has many nodes and many CPUs in changing the configuration of the computer system to one that fits to an application program based on memory access characteristics specific to each application program.

BRIEF DESCRIPTION OF THE DRAWINGS

FIGS. 5A and 5B are block diagrams showing how the memory latency is measured, in which FIG. 5A shows a CAM and a register file 117 at the start of a memory access request transaction and FIG. 5B shows the CAM, the register file 117, and a register file 118 in a response transaction.

FIG. 15 shows an image of a screen on which the result of measuring the memory latency is displayed by the management console.

FIG. 17 is an explanatory diagram showing an example of configuration change.

FIG. 19 is a table showing changes that are suggested as configuration change assistance.

FIG. 24 is a table showing the relation between the observation range, the measurement range, the shift width, and the upper bound value according to the third embodiment.

FIG. 25 is a truth table that defines the operation of a selector according to the third embodiment.

DETAILED DESCRIPTION OF THE PREFERRED EMBODIMENTS

Embodiments of this invention will be described below with reference to the accompanying drawings.

(Target Computer System)

Figure 1:
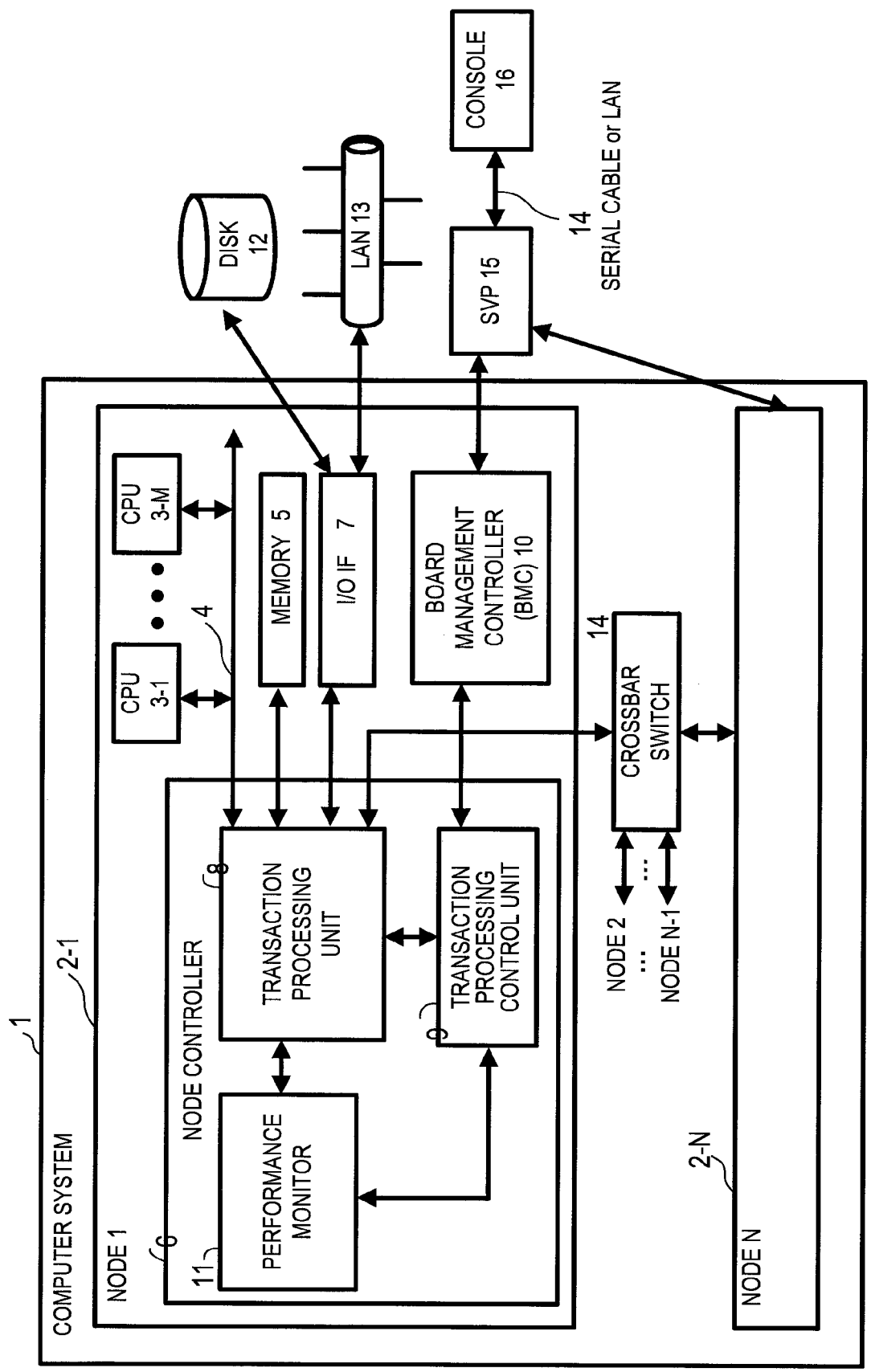
FIG. 1 is a block diagram of a physically partitionable computer system according to a first embodiment of this invention.

FIG. 1 shows a first embodiment through a block diagram of a computer system equipped with a hardware monitor of this invention.

A computer system 1 shown in FIG. 1 is composed of multiple nodes 2-1 to 2-N (N is an integer). The nodes 2-1 to 2-N are connected to one another via a crossbar switch 14. One node (for example, the node 2-1) contains multiple CPUs 3-1 to 3-M (M is an integer equal to or larger than 1) which include cache memories, a main memory 5 which stores a program and data, an I/O interface 7 which connects to a network (LAN) 13 and to a disk subsystem (DISK) 12, a board management controller (hereinafter abbreviated as BMC) 10, which manages hardware of the node 2-1, and a chipset (hereinafter referred to as node controller) 6 which interconnects the CPUs 3-1 to 3-M, the main memory 5, the I/O interface 7, and the BMC 10. The rest of the nodes, namely, the nodes 2-2 to 2-N, have the same configuration.

The CPUs 3-1 to 3-M are connected to the node controller 6 via a CPU bus (or a front-side bus) 4. The BMC 10 included in each node is connected to a service processor (SVP) 15.

The SVP 15 is connected to a management console 16 via a serial cable or local area network 17. The node controller 6 is composed of a transaction processing unit 8, a transaction processing control unit 9, and a performance monitor 11, which are interconnected within the node controller 6.

(Operation Outline)

A description will be given below on an access operation of the CPUs in the nodes 2-1 to 2-N to access the main memory 5 and how the computer system 1 is accessed from the management console 16. Since the CPUs 3-1 to 3-M have the same configuration and operate in the same manner, the following description deals with only the CPU 3-1 and omits description of the rest of the CPUs.

When necessary data is not in a cache memory (not shown) built in the CPU 3-1, a memory access request is issued to the CPU bus 4 in order to fetch the necessary data from the main memory 5.

In the case where the data requested by the CPU 3-1 is in a cache of one of the other CPUs 3-2 to 3-M, connected to the same CPU bus 4, the data is transferred from the CPU to the CPU 3-1 via the CPU bus 4. In the case where the data is not found along the same CPU bus 4, the memory access request is issued to the transaction processing unit 8 inside the node controller 6.

The transaction processing unit 8 issues a memory access request to a unit that has a cache memory (here, the CPUs of all nodes), and performs snooping processing for maintaining the coherency among the cache memories of the CPUs 3-1 to 3-M. At the same time, the transaction processing unit 8 judges whether the request is directed to the main memory 5 that is in its own node 2-1 or the main memory 5 that is in one of the other nodes 2-2 to 2-N, and transfers the main memory read request to the node to which an address in the request is assigned.

Data read out of the main memory 5 in question is transferred to the CPU 3-1, which has issued the request, via the crossbar switch 14, the transaction processing unit 8, and then the CPU bus 4 when the main memory 5 is located in one of the other nodes, and when this main memory 5 is located in the own node, the read data is transferred to the CPU 3-1, which has issued the memory access request, via the transaction processing unit 8 and the CPU bus 4.

A memory access request (a memory request transaction) is comprised of a request type, a transaction ID number, and a requested physical address. In the computer system 1 according to this embodiment, a memory access request and a response to the memory access request are called a memory access response (a memory response transaction), which is constituted of a response type, data read out of a memory (the main memory 5 or a cache memory), and a transaction ID number. A memory access request and a corresponding memory access request share the same transaction ID number. Therefore, the transaction ID number alone is necessary to identify which response is associated with which request.

An administrator of the computer system 1 issues a request to reset or boot the system, or the like, to the SVP 15 from the management console 16. The SVP 15 relays these requests to the BMCs 10 in the nodes 2-1 to 2-N to which the requests are directed. Each BMC 10 transfers the request to the transaction processing control unit 9.

Figure 2:
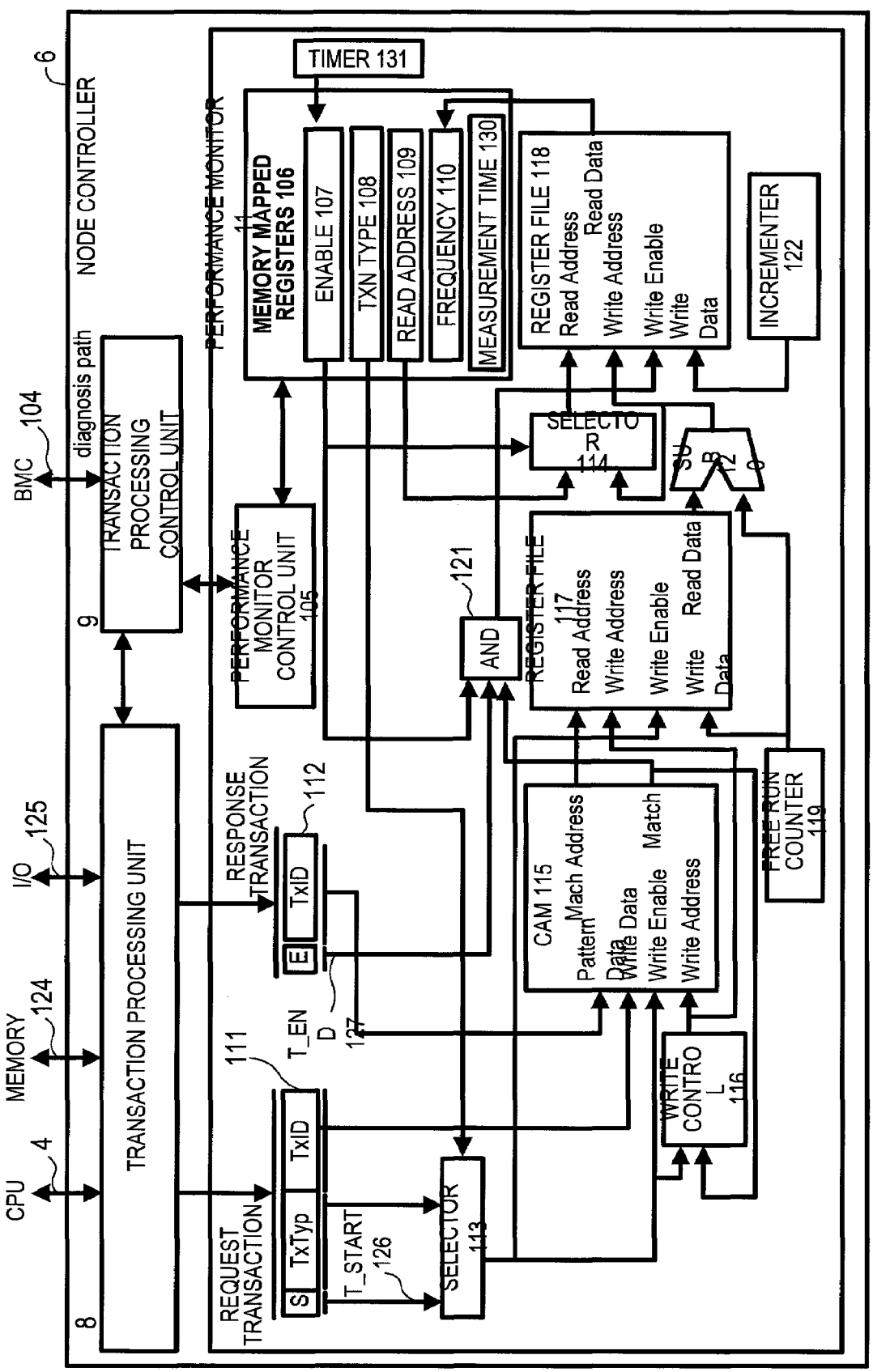
FIG. 2 is a block diagram showing the configuration of a node controller.

The transaction processing control unit 9 reads and writes data in a memory mapped register 106 shown in FIG. 2 in order to initialize, or change the operation mode of, the transaction processing unit 8 and the performance monitor 11, thereby initializing, or switching the operation mode of, the system (or the node). The memory mapped register 106 is set in advance at a given location in the main memory 5. The nodes 2-1 to 2-N can be set with a setting command from the SVP 15 to operate as separate computer systems. In other words, the computer system 1 can be run in a mode where each node operates as an individual computer and different OSs are activated.

(Relation Between Node Count and Memory Latency)

When multiple nodes 2-1 to 2-N are connected by the crossbar switch 14 to form one computer system, the main memory in a node that has a CPU from which a memory access request has been issued is called a local memory whereas the main memory in any other node than the one that has the CPU from which a memory access request has been issued is called a remote memory, and the memory latency (response time or delay time) of a local memory is shorter than that of a remote memory owing to no inter-node communications. There are roughly two types of method to arrange a local memory and a remote memory in the physical memory space.

One is the interleave mode in which the nodes 2-1 to 2-N are arranged in order with a gap about the line size of the cache memories of the CPUs 3-1 to 3-M. The other is the Non-uniform Memory Access (NUMA) mode in which the nodes 2-1 to 2-N are each given a continuous address space and memory areas are piled up. In the NUMA mode, firmware notifies the OS in each of the nodes 2-1 to 2-N of the relation between the CPUs 3-1 to 3-M, a physical memory space, and the I/O interface 7 that belong to the node, and the OS makes the relation reflected on process, or thread, scheduling.

In the interleave mode, the following formula applies in most memory access whatever type of memory access it is:

(Average memory Latency in interleave mode)={(local memory access latency)+(remote memory access latency)×(node count−1)}/(node count)

When the remote memory access latency is much larger than the local memory access latency, which makes the average memory latency large, the NUMA mode may be employed instead. Then tuning on the OS level and the application program level is necessary so that memory access is contained in the local memory area. Alternatively, the interleave mode may be employed in a part of the physical memory space while the NUMA mode is employed in another part of the physical memory space.

(Configuration of Performance Monitor)

The configuration of the performance monitor 11 placed in the node controller 6 will be described below with reference to FIG. 2.

In the node controller 6, the performance monitor 11, the transaction processing unit 8, and the transaction processing control unit 9 are connected to one another. The transaction processing control unit 9 is connected to the BMC 10 of FIG. 1 via a diagnostic path 104. The transaction processing unit 8 is connected to the CPUs 3-1 to 3-M through the CPU bus 4, to the main memory 5 through a memory channel 124, and connected to an I/O bridge or the I/O interface 7 through an I/O channel 125.

The performance monitor 11 is composed of a request transaction register 111, which receives an arrival signal of a memory access request from the CPU side, a response transaction register 112, which receives a response from the main memory 5, a performance monitor controller unit 105, which controls the performance monitor 11, the memory mapped register 106, which is set in the main memory 5 in advance, selectors 113 and 114, which select signals to output, a content addressable memory (CAM) 115, a CAM write control unit 116, which controls write in the CAM 115, register files (register arrays) 117 and 118, a free-run counter 119, which updates the counter value in a given cycle, a subtracter 120, an AND gate 121, and an incrementer 122.

The performance monitor control unit 105 is connected to the transaction processing control unit 9 and to the memory mapped register 106.

The selector 113 is connected to the request transaction register 111 and to a transaction type register 108 of the memory mapped register 106. An output of the selector 113 is connected to the CAM 115, the CAM write control unit 116, and the register file 117.

Output signals of the response transaction register 112, an enable register 107 of the memory mapped register 106, and the CAM 115 are input to the AND gate 121, and an output of the AND gate 121 is connected to the register file 118.

The CAM write control unit 116 receives as an input an output signal of the selector 113 and a match signal which is an output signal of the CAM 115, and is connected to a data write address signal of the CAM 115.

A match address signal which is an output of the CAM 115 is connected to a read address input of the register file 117.

The free-run counter 119 is connected to a write data input of the register file 117.

A read data signal that is an output of the register file 117 and the free-run counter 119 are connected to an input of the subtracter 120.

An output signal of the subtracter 120 and the selector 114 are connected to a write address input of the register file 118.

A read data signal that is an output of the register file 118 is connected to an input of the incrementer 122. An output of the incrementer 122 is connected to a write data input of the register file 118.

A read address register 109 of the memory mapped register 106 and an output signal of the subtracter 120 are input to the selector 114. The enable register 107 of the memory mapped register 106 is input as a signal to choose which is input to the selector 114. When the enable register 107 is "1" and the subtracter 120 is "0", the read address register 109 is chosen. An output of the selector 114 is connected to a read address input of the register file 118.

A read data output of the register file 118 is connected to a frequency register 110 of the memory mapped register 106.

The node controller 6 is designed such that, when write enable is "1", the CAM 115 and the register files 117 and 118 each write data of the write data input in an entry at an address that is designated by the write address input.

A measurement time register 130 of the memory mapped register 106 is connected to a timer 131, which is connected to the enable register 107.

With the above configuration, the local memory latency and the remote memory latency are measured in a manner described below, and a histogram is provided to be used in judging whether or not it is the main memory 5 or the node controller 6 that is causing a performance bottleneck of the computer system 1.

Basically, the performance monitor 11 measures the latency and the access frequency at the address of a memory access request transaction, based on the start time of the memory access request transaction and the arrival time of a corresponding memory response transaction, using the register files 117 and 118 and hardware of the subtracter 120 or the like, and keeps the access frequency at this address in the register file 118 (measurement result storing unit). This means that a measured latency (response time) is stored in the register file 118 in association with the issue count of a corresponding memory access request transaction.

(Operation of Performance Monitor)

The operation of the performance monitor 11 shown in FIG. 2 will be described below with reference to the drawings.

Figure 3:
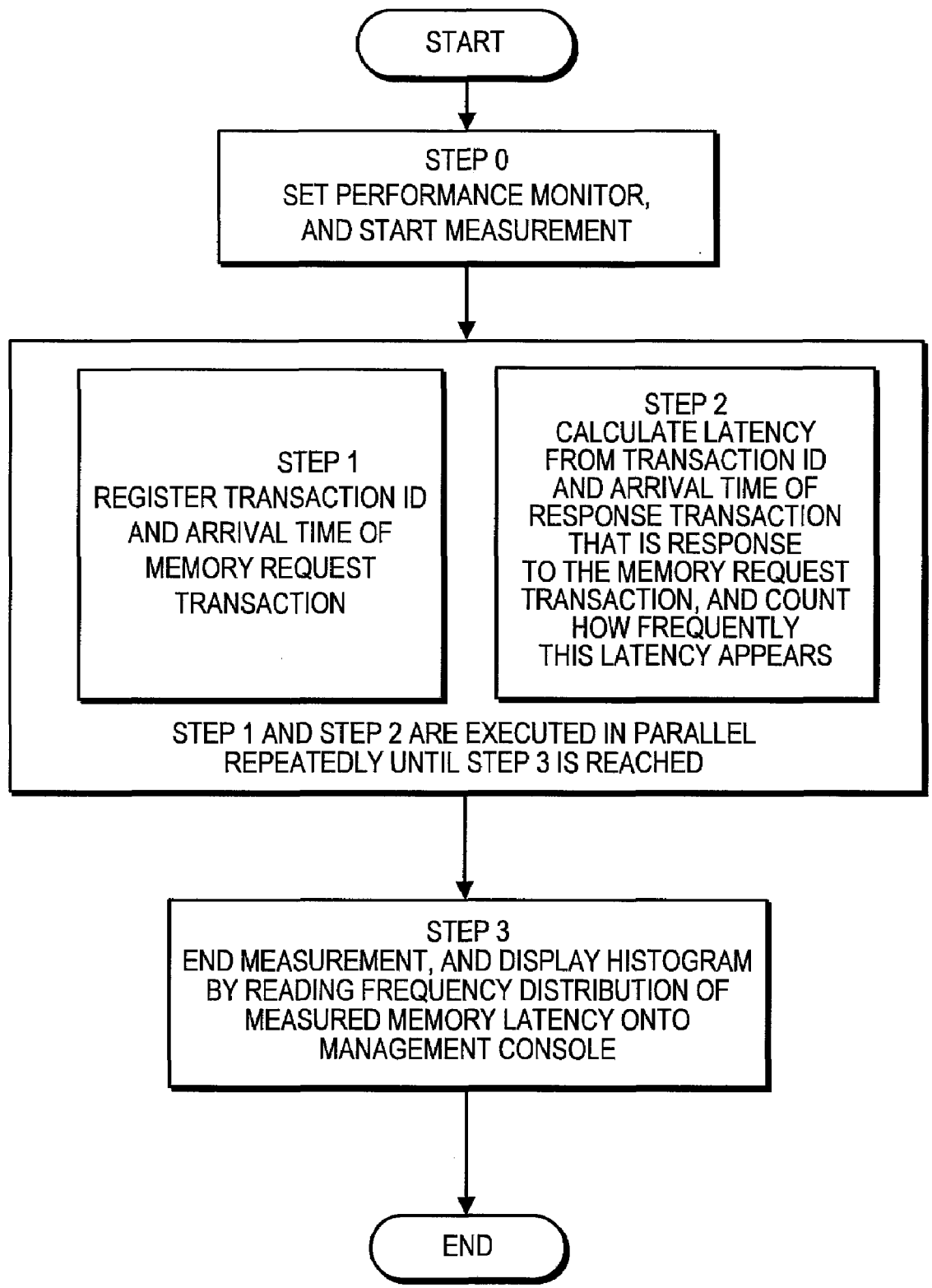
FIG. 3 is a flow chart showing an example of processing that is executed in a performance monitor of the node controller.

Processing of creating a histogram for the memory latency of a memory access request is divided into the following four stages as shown in a flow chart shown in FIG. 3. The flow chart shown in FIG. 3 illustrates processing that is executed by the performance monitor control unit 105 of the performance monitor 11.

Figure 4:
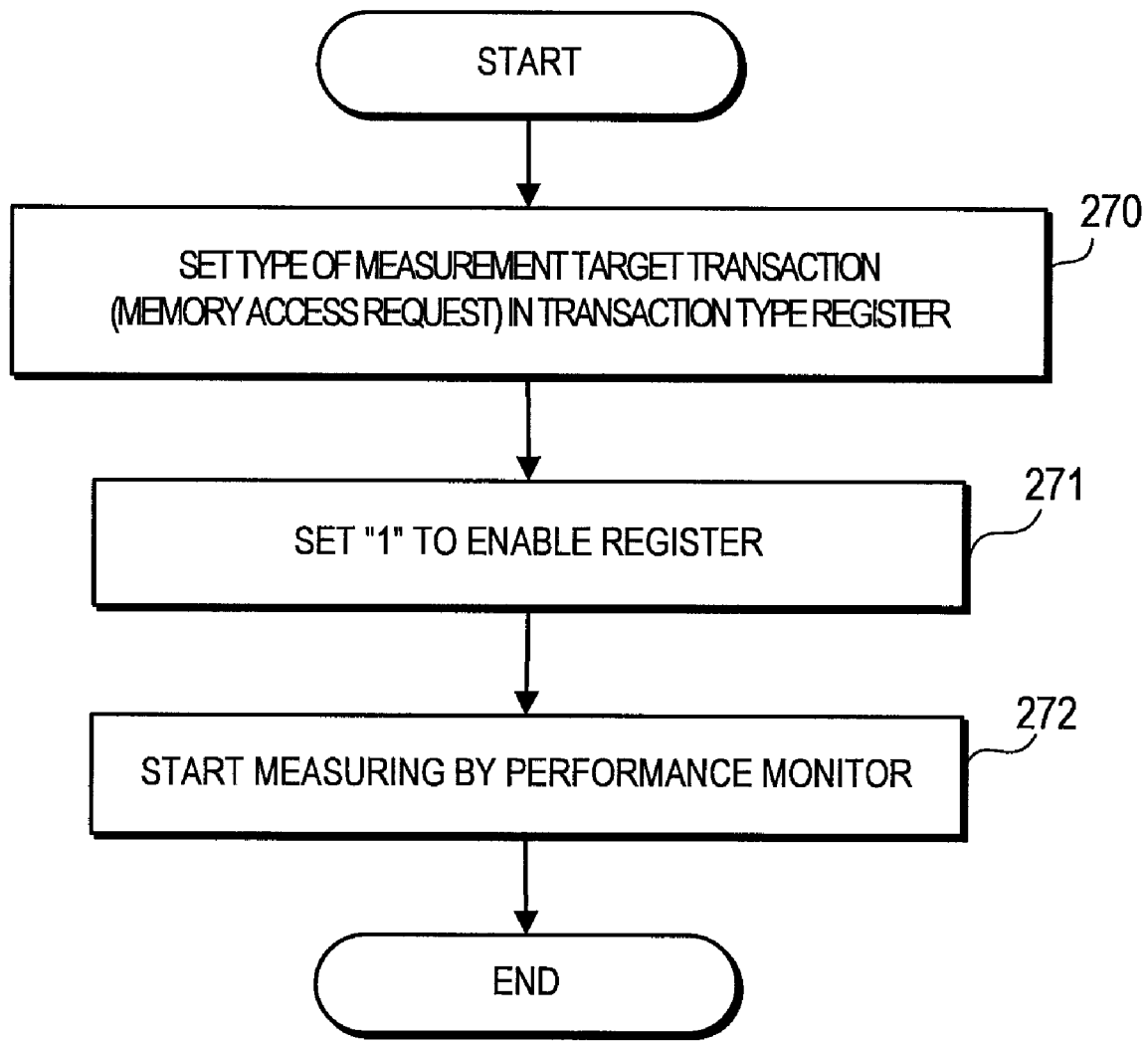
FIG. 4 is a flow chart showing an example of processing that is executed in Step 0 of FIG. 3.

Step 0: Setting of the performance monitor 11, and start of the measurement (FIG. 4).

Figure 5A:
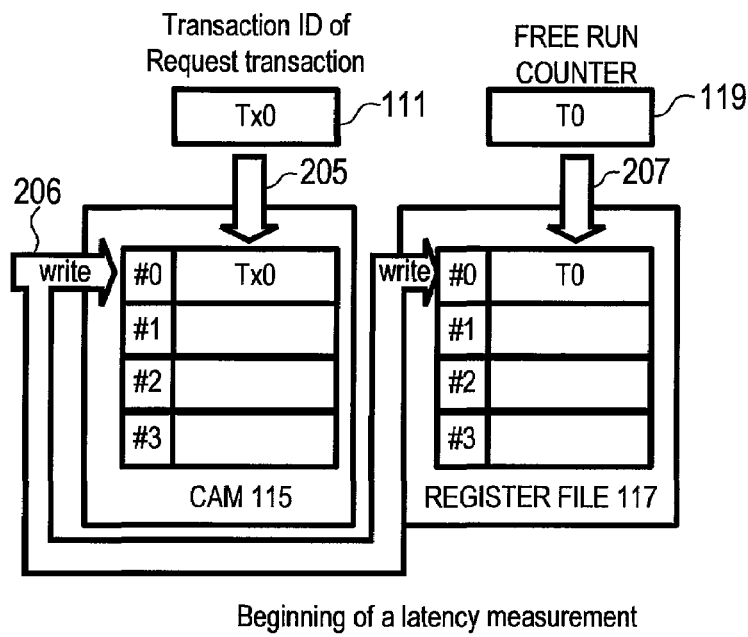
Figure 6:
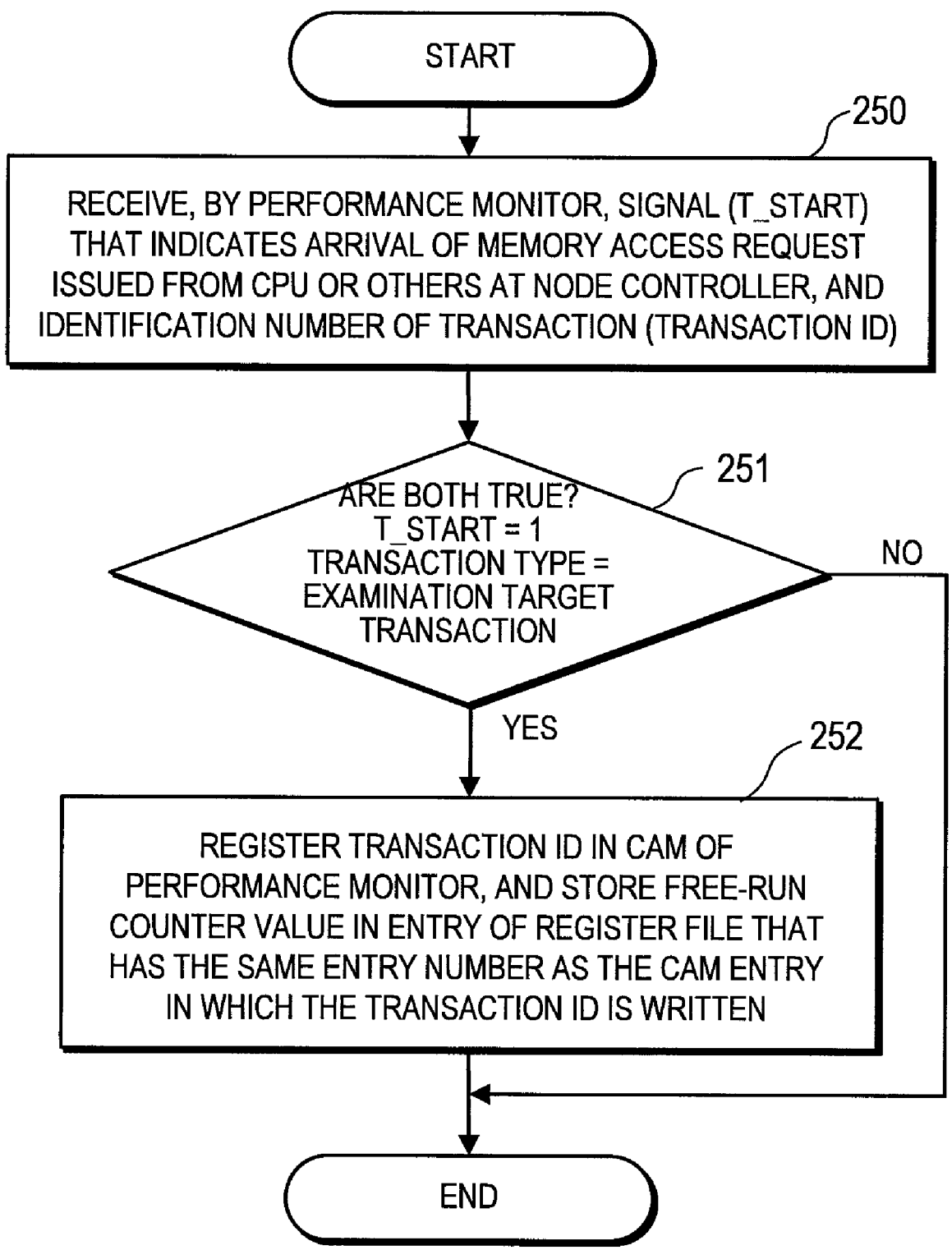
FIG. 6 is a flow chart showing an example of processing that is executed in Step 1 of FIG. 3.

Step 1: Registration of the transaction ID and arrival time of a memory request transaction (FIGS. 5A and 6).

Figure 5B:
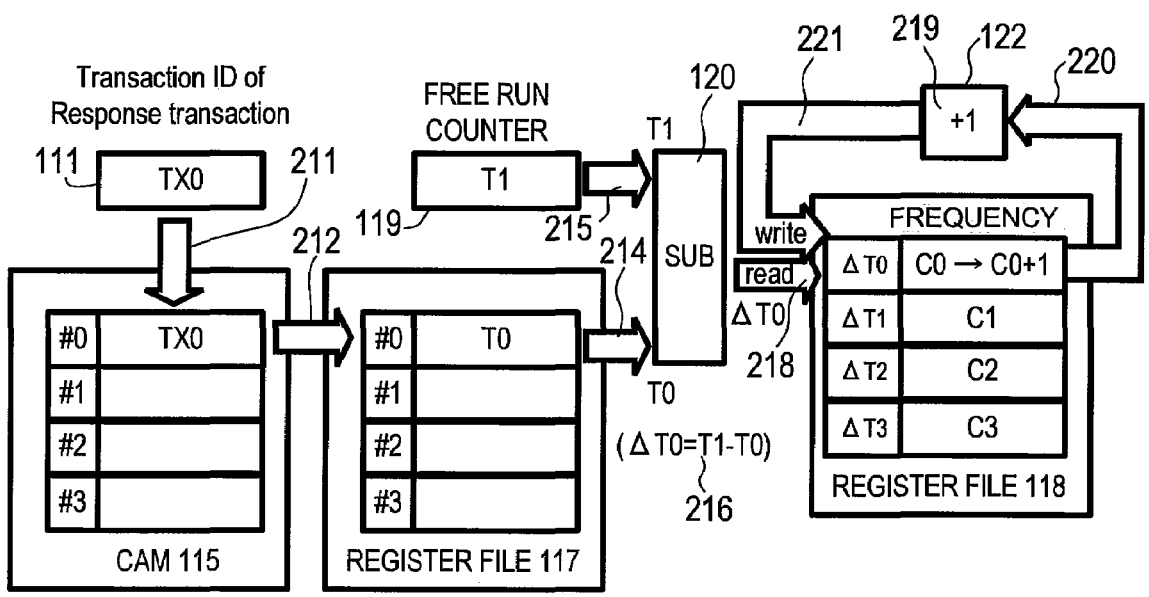
Figure 7:
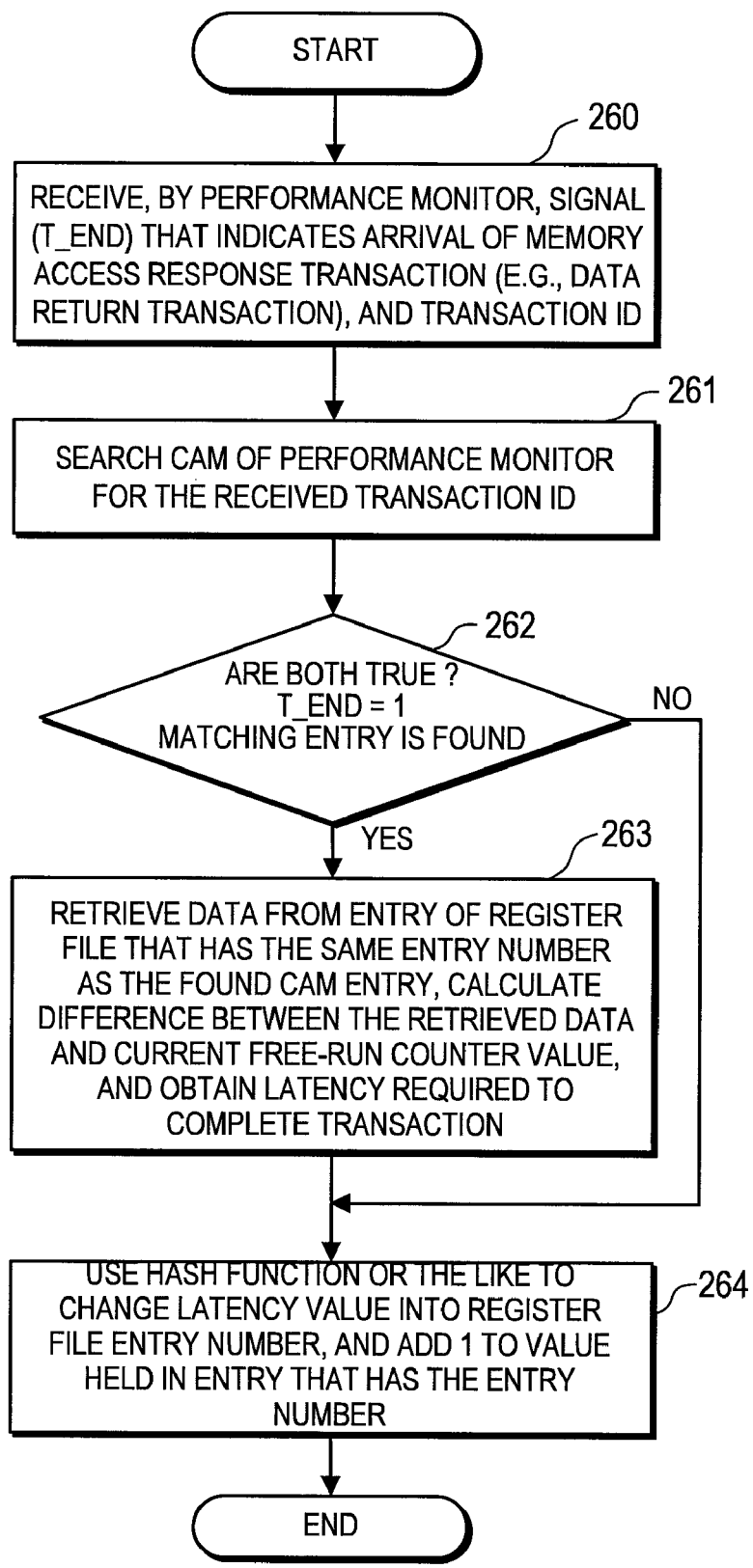
FIG. 7 is a flow chart showing an example of processing that is executed in Step 2 of FIG. 3.

Step 2: Latency calculation using the transaction ID and arrival time of a response transaction that is a response to the memory request transaction, and counting of its frequency (FIGS. 5B and 7).

Figure 8:
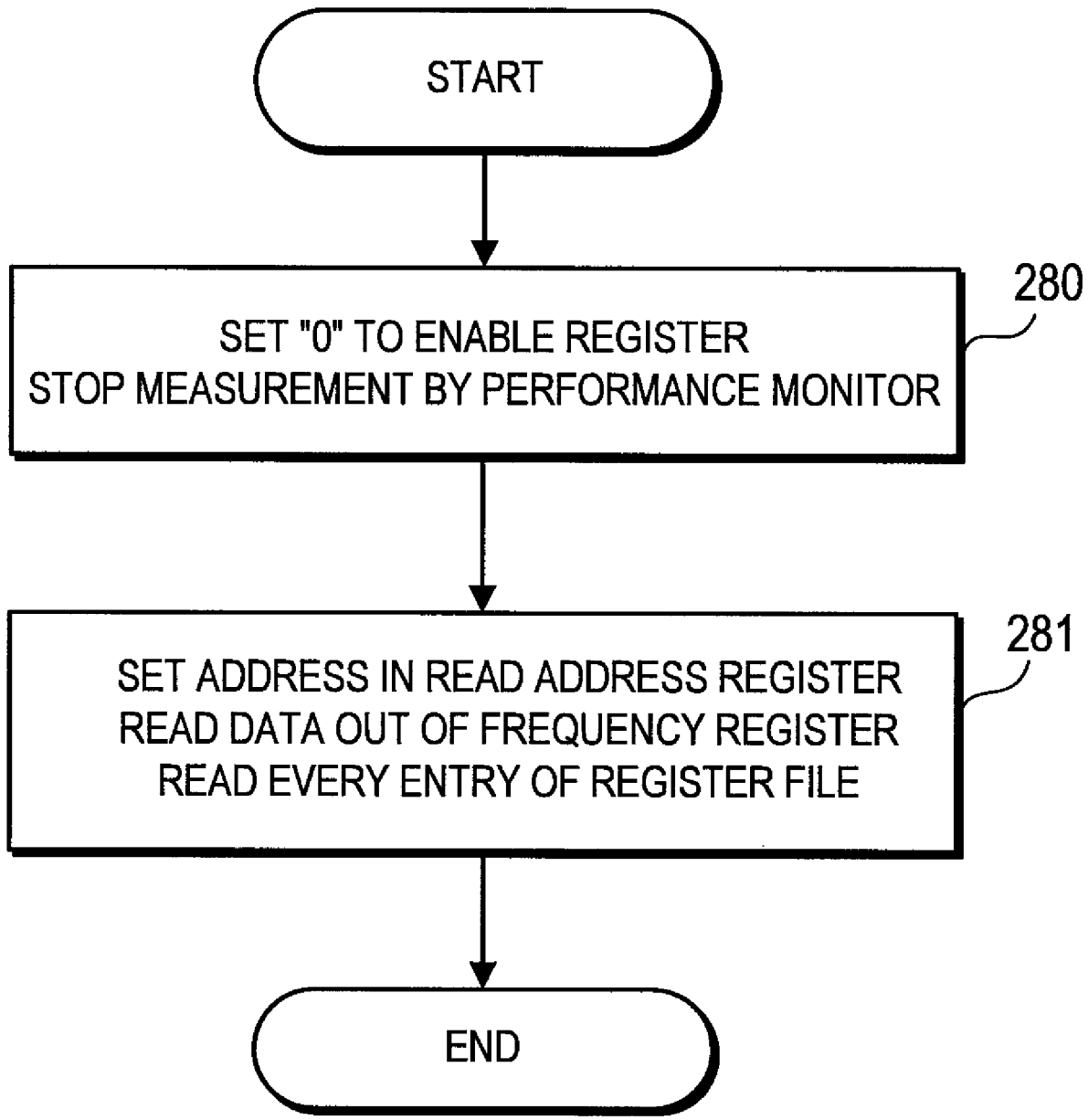
FIG. 8 is a flow chart showing an example of processing that is executed in Step 3 of FIG. 3.
Figure 10:
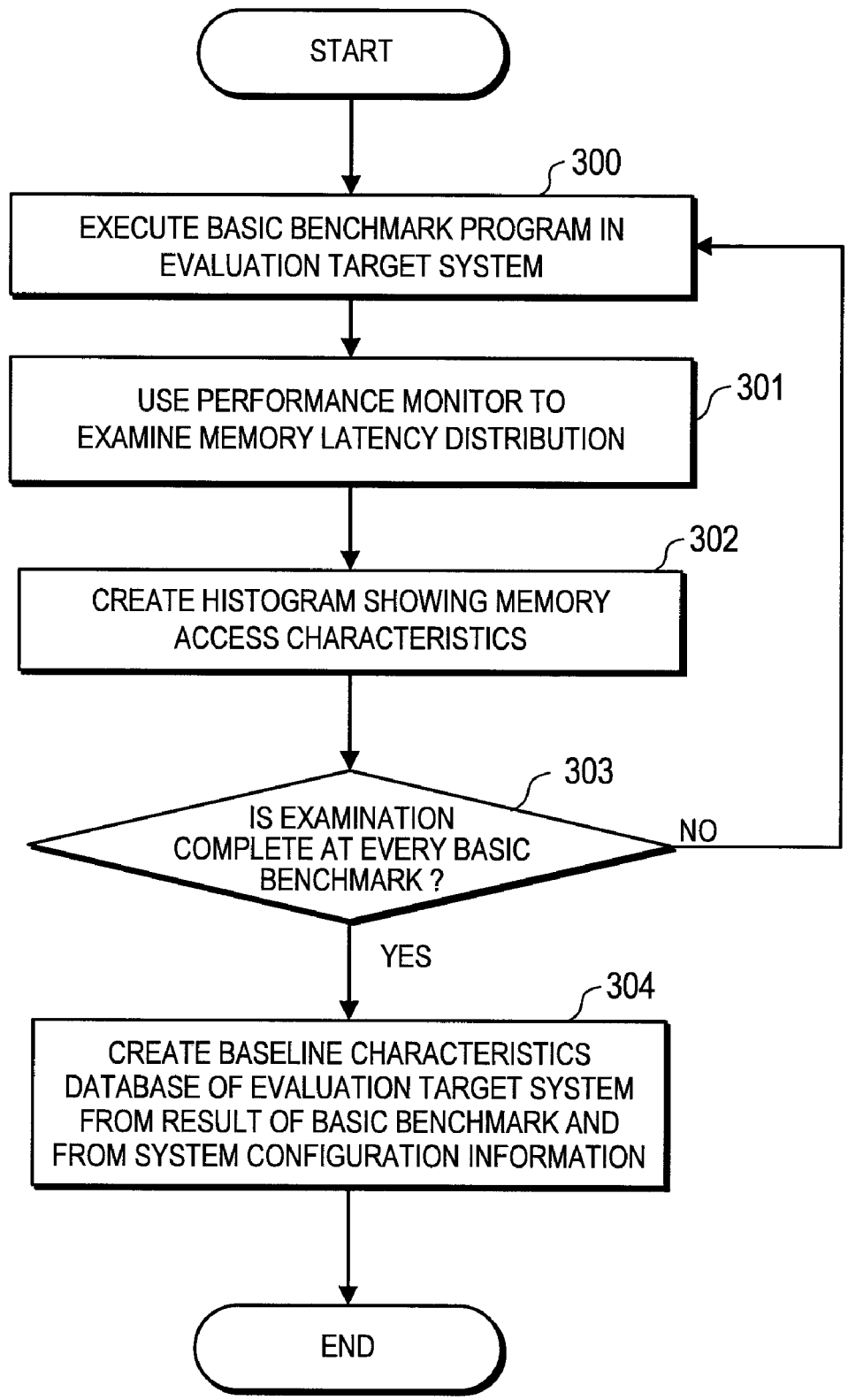
FIG. 10 is a flow chart showing steps of a preliminary examination phase in which performance information (a baseline characteristics database) unique to the computer system is measured.

Step 3: Stop of the measurement, reading of the frequency distribution of the measured memory latency by the management console 16, and displaying of a histogram (FIGS. 10 and 8).

In the histogram measurement of the memory latency, Step 1 and Step 2 are executed in parallel after the measurement is started, and both are repeatedly executed. Step 3 is executed after the measurement is finished.

Details of the respective processing stages will be given below.

(Step 0)

The operation in Step 0 shown in FIG. 3 will be described with reference to a flow chart shown in FIG. 4.

First, the BMC 10 is accessed by the management console 16 via the SVP 15 or the like, and the diagnostic path 104 is used to register a code that indicates the type of a measurement target transaction in the transaction type register 108 of the memory mapped register 106 in the performance monitor 11 (Step 270).

Next, the BMC 10 is accessed by the management console 16 via the SVP 15 or the like, and the diagnostic path 104 is used to set "1" to the enable register 107 of the memory mapped register 106 in the performance monitor 11. As long as the enable register 107 is "1", the performance monitor 11 executes the measurement (Step 271). In this case, the performance monitor 11 starts the memory latency measurement when "1" is set to the enable register 107, and ends the measurement when "0" is set to the enable register 107.

To make the performance monitor 11 stop the measurement, "0" is set to the enable register 107 through direct access from the SVP 15. Another option is to automatically end the measurement after a given length of time. The measurement can be automatically ended by setting a measurement machine cycle count in the measurement time register 130 before the measurement is started, setting "1" to the enable register 107 and thus causing the timer 131 to start counting the cycle count set in the measurement time register 130 and, when the set cycle count is counted up, having the timer 131 set "0" to the enable register 107.

(Step 1)

The outline of Step 1 shown in FIG. 3 will be given with reference to FIG. 5A. A transaction ID 210 assigned to a memory request transaction which is issued from the transaction processing unit 8 to the performance monitor 11 is registered in the CAM 115 (205). In FIG. 5A, a transaction ID "Tx0" is registered in an entry having an entry number #0. The CAM 115 is a special memory that is also called an associative memory. Pieces of data stored in the CAM 115 and external reference data are compared in parallel and, when there is matching data, the CAM 115 outputs a match signal and the address of an entry that holds the matching data.

The data is registered in the CAM 115, and at the same time, the value of the free-run counter 119 is written in an entry that has the same entry number as the entry of the CAM 115 in the register file 117 in which the data has been written (207). In FIG. 5A, a value "T0" is written in an entry #0.

Next, referring to FIG. 6, details of Step 1 will be described.

The transaction processing unit 8 receives a memory access request transaction (memory request transaction) issued in one of the CPUs 3-1 to 3-M via the CPU bus 4. Immediately after the reception, the transaction processing unit 8 sends, to the performance monitor 11, an arrival signal (T_START) of the memory access request, the type of the transaction, and the ID of the transaction. The performance monitor 11 registers these signal and data in the request transaction register 111 (FIG. 5A) (Step 250).

The memory access request arrival signal T_START is used at this point to judge whether or not the transaction is valid. Here, a transaction is valid when T_START is "1".

When the memory access request arrival signal T_START is "1", the transaction type matches data registered in the transaction type register 108, and the transaction enable register is "1", the output of the selector 113 is "1" and the write enable input of the CAM 115 as well as the write enable input of the register file 117 are set to "1" to be activated (Step 251).

At this point, the transaction ID entered as the write data of the CAM 115 is written in an entry of the CAM 115 that is designated by a write address output from the CAM write control unit 116. Simultaneously, the value of the free-run counter 119 is stored in an entry of the register file 117 that is designated by the write address (Step 252). A time indicated by the free-run counter 119 is set in this entry of the register file 117, and the time serves as the start time of the memory access request transaction.

The CAM write control unit 116 manages the use state of entries holding data of the CAM 115, and sequentially issues write addresses associated with entries that are on a list of unused entries to the CAM 115. When data is written in the entry, the entry is removed from the unused entry list. An entry that has been hit in search processing of Step 2 described below is recycled as an unused entry.

(Step 2)

The outline of Step 2 of FIG. 3 will be given with reference to FIG. 5B. The computer system 1 of this embodiment is designed such that a memory request transaction and a memory response transaction which is a response to the former share the same transaction ID. This is utilized in obtaining the memory latency.

The transaction processing unit 8 searches among the transaction IDs of memory response transactions issued to the performance monitor 11 for one that matches data stored in the CAM 115 (211). When a matching transaction ID is found, the CAM 115 outputs to the register file 117 the address of an entry that holds the matching transaction ID (212). Data is then read out of an entry of the register file 117 that has this address (214). The read data 214 corresponds to the start time of a transaction for reading the main memory 5, and the subtracter 120 obtains the difference between the read data 214 and a value T1 of the free-run counter 119 which corresponds to the end time of this transaction (218), thereby calculating the memory latency ($\Delta T0$) (218). The calculated memory latency is input to the register file 118 as a read address (218), and read data C0 (220) is input to the incrementer 122 to be added by 1 (219). An entry at the top of the register file 118 is updated with the resultant data, C0+1 (221).

Details of Step 2 will be given next with reference to a flow chart of FIG. 7.

Immediately before the transaction processing unit 8 issues over the CPU bus 4 a memory access response transaction (memory response transaction) in response to the memory access request transaction, an arrival signal (T_REND) of this memory access response and the transaction ID are sent from the transaction processing unit 8 to the performance monitor 11. The performance monitor 11 registers the received transaction ID and arrival signal in the request transaction register 111 (Step 260 of FIG. 7).

The CAM 115 is searched with the transaction ID as a key (Step 261), and judges whether or not there is matching data (Step 262). When matching data is found, the CAM 115 outputs a match signal "1", and simultaneously outputs an address signal (match address) that indicates the entry number of an entry that holds the matching data. The address signal is input to the register file 117, and read data and the value of the free-run counter 119 are input to the subtracter 120. The resultant output of the subtracter 120 which corresponds to the latency is input as a write address signal of the register file 118 (Step 263).

The match signal (match) of the CAM 115 and data of the enable register 107 in the memory mapped register 106 are input to the AND gate 121. The resultant output of the AND gate 121 is sent to the write enable input of the register file 118. The selector 114 transfers the output of the subtracter 120 to the read address input of the register file 118 when the enable register 107 of the memory mapped register 106 is "1". The register file 118 reads data of the entry at the address, and outputs the read data. The read data is input to the incrementer 122, and a value obtained by adding 1 to the read data is input as write data of the register file 118. Since the write enable of the register file 118 at this point is "1" as described above, data of an entry that has an address designated by the write address input is updated with the value of the input write data (Step 264).

(Step 3)

The operation in Step 3 shown in FIG. 3 will be described with reference mainly to FIG. 8.

The BMC 10 is accessed by the management console 16 via the SVP 15 or other routes, and the diagnostic path 104 is used to set "0" to the enable register 107 of the memory mapped register 106 in the performance monitor 11, thereby ending the measurement (Step 280). In the case where the automatic ending option which uses the measurement time register 130 of the memory mapped register 106 is chosen, the enable register 107 is automatically set to "0" after a set cycle count is up. Accordingly, there is no need to set "0" to the enable register 107 through the SVP 15, and the performance monitor 11 automatically stops measuring after a preset measurement time elapses.

Next, in order to read data out of the register file 118, the BMC 10 is accessed by the management console 16 via the SVP 15 or other routes, and the diagnostic path 104 is used in setting a read address of the memory mapped register 106 in the performance monitor 11. After the read address is set, data at the read address in the register file 118 is stored in the frequency register 110 of the memory mapped register 106. This data in the frequency register 110 is displayed on the management console 16, which accesses the BMC 10 via the SVP 15 or other routes and uses the diagnostic path 104 to do so, or is saved in a file or the like by the management console 16. This operation is repeated so that data of every entry in the register file 118 is read to be displayed, or saved in a file, by the management console 16 (Step 281).

Figure 9:
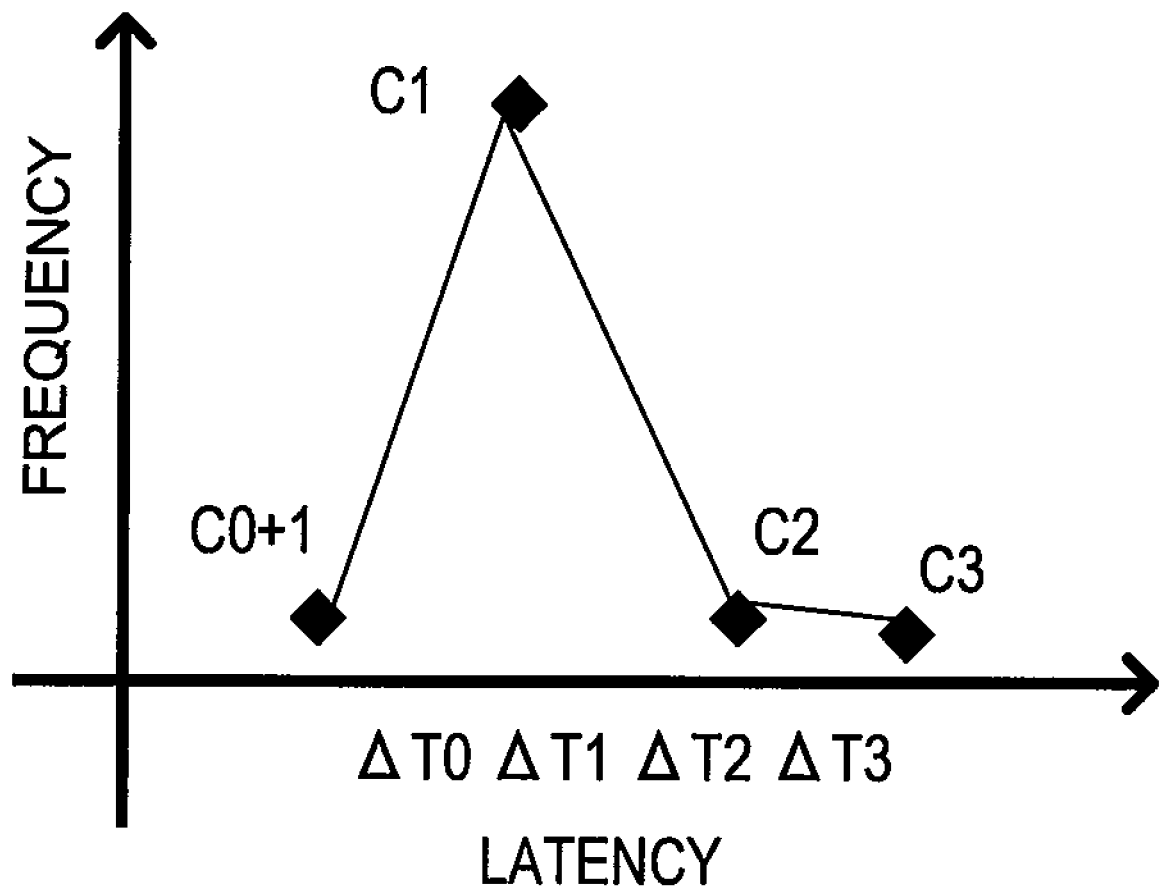
FIG. 9 is an explanatory diagram showing an example of the result of measuring the memory latency and the access frequency output from a management console as a histogram.

Through the above processing, the memory latency and access frequency of a node which are measured by the node controller 6 are displayed on a display device or the like of the management console 16 as shown in FIG. 9.

FIG. 9 shows an example of a memory latency histogram displayed on the display device (not shown) of the management console 16. The histogram in the example of FIG. 9 is created from the data in the register file 118 of FIG. 5B.

The axis of abscissa in FIG. 9 shows the memory latency (latency). The addresses ΔT0, ΔT1, ΔT2, and ΔT3 of entries in the register file 118 correspond to the memory latencies. The axis of ordinate shows the frequency indicating, for each memory latency value, how many times the memory latency value has appeared. Values held in the entries of the register file 118 here are C0+1, C1, C2, and C3.

With a graph like this, access characteristics in accessing the local memory or the remote memory can be examined. For example, in a case of an application program that mainly causes access to the local memory, a performance bottle neck due to a flood of access to the local memory can be improved by increasing DIMMs of the main memory 5 in number and thus increasing channels of the main memory 5 in number. In the case of an application program that causes frequent access to both the local memory and the remote memory, a performance bottle neck of the computer system 1 can be improved by switching the memory access mode from NUMA to the interleave mode. Making the memory latency and the frequency into a histogram in this manner enables the computer system 1 to readily grasp memory access characteristics specific to an application program and to provide assistance to the system administrator in improving a bottleneck of the computer system 1.

(Application to Other Latency Measurements)

The above description deals with measures and operation for creating a memory latency histogram of memory access requests from the CPUs 3-1 to 3-M. If, for example, main memory read requests in DMA transfer (DMA read commands) in I/O are employed instead of memory access requests from the CPUs 3-1 to 3-M, a histogram showing memory access characteristics in DMA transfer can be created and can be applied to an examination of DMA transfer performance. For example, when the node controller 6 receives a request to access the main memory 5 from a DMA control unit (not shown) of the I/O interface 7, the memory latency and the access frequency can be measured in association with each other as in the above description where memory access requests from the CPUs 3-1 are used.

(Memory Access Characteristics Examination Method)

A description will be given on how memory access characteristics of an application program are examined with the use of a histogram obtained through the above-described measures and method. This memory access characteristics examination is composed of the following two phases:

(1) Preliminary examination phase: A basic benchmark program is executed to create a baseline characteristics database.

(2) Actual measurement phase: A memory latency histogram of an examination target application program in operation is created and compared with the baseline characteristics database to estimate memory access characteristics of the application program.

(1) Preliminary Examination Phase

Processing executed in the preliminary examination phase will be described with reference to FIG. 10.

First, a basic benchmark program is executed in the evaluation target computer system 1 (Step 300). In the preliminary examination phase, performance (memory latency) unique to the computer system 1 is measured by executing the basic benchmark program while the examination target application program is not in operation. Measuring performance unique to the computer system 1 in advance makes it possible to grasp the characteristics of the application program later.

Employed as the basic benchmark program is a program for measuring the memory latency or a benchmark program measuring the memory throughput performance. LMBENCH (http://www.bitmover.com/lmbench) and STREAM (http://www.cs.virginia.edu/stream/), for example, are well-known benchmark programs. In general, benchmark programs that measure the memory throughput performance are a heavy load to such components as the CPU bus 4, the chipset 6, and the main memory 5. "Heavy load" here means high system resource operation ratio, for example, high utilization ratio of the CPU bus 4. On the other hand, programs for measuring the memory latency as "lat_mem_rd" contained in LMBENCH involve processing of shifting through a pointer list, and keep the utilization ratio of system resources such as the CPU bus 4 very low.

Next, while the basic benchmark program is in operation, a memory latency histogram is created with the use of the performance monitor 11 (Step 301).

A memory latency histogram is created for every basic benchmark prepared in advance (Step 303).

Lastly, a baseline characteristics database of the evaluation target system is created from the result of executing the basic benchmark program and system configuration information (Step 304).

Figure 11:
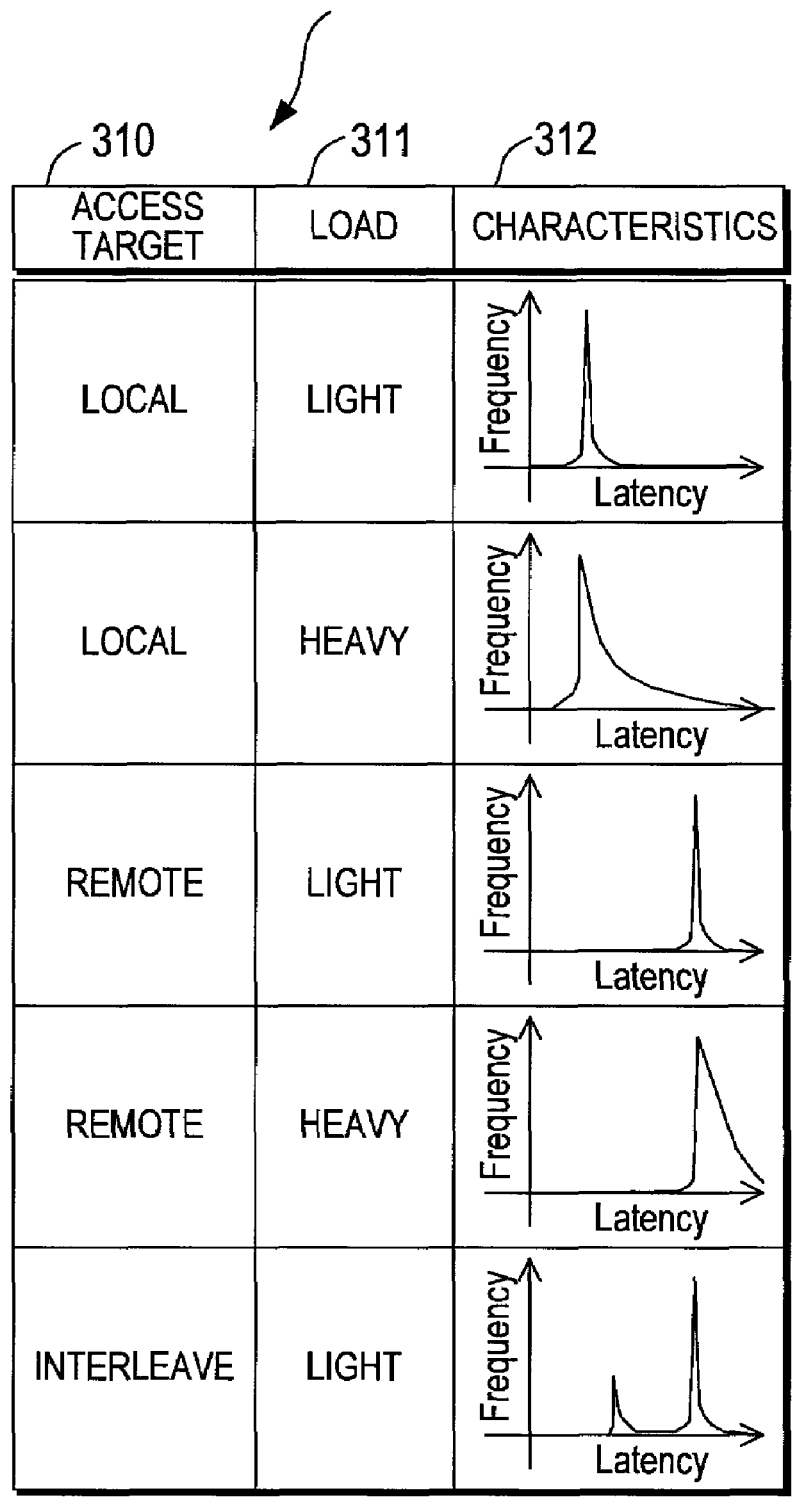
FIG. 11 is an explanatory diagram showing an example of the baseline characteristics database.

An example of this baseline characteristics database is shown in FIG. 11. A baseline characteristics database 506 is constituted of an item "access target" (310), which indicates the physical location of a memory (local memory or remote memory) accessed by the CPUs 3-1 to 3-M, an item "load" (311), which indicates whether the utilization ratio of hardware resources such as the CPU bus 4 is high or low, and an item "characteristics" (312) under which a memory latency histogram is registered.

The baseline characteristics database in the example of FIG. 11 has five entries but, in practice, how many data entries are to be registered in the baseline characteristics database is determined by the number of combinations of a basic benchmark count and a memory access mode (NUMA/interleave). Also, there is information that cannot be obtained by simply executing a basic benchmark program, for example, information about whether or not a local memory or a remote memory is mounted. The system administrator or other person operating the management console 16 therefore creates the baseline characteristics database 506 by referring to the architecture of the measurement target computer system 1. The created baseline characteristics database 506 can be stored in storage of the management console 16 or the like.

A value "LOCAL" registered as the access target 310 in FIG. 11 indicates that the accessed memory is a local memory and "REMOTE" indicates that the accessed memory is a remote memory. These values can readily be measured by operating the aforementioned memory latency measuring program of LMBENCH in the NUMA mode, except that which CPU is to execute the latency measurement program has to be identified in advance. A value "INTERLEAVE" is obtained as a result of measuring the memory latency when the interleave mode is chosen as the memory access mode. In these memory latency measurements, the utilization ratio of system resources such as the CPU bus 4 is low and, accordingly, "LIGHT" indicating light load is registered as the load 311.

In the case of the STREAM benchmark program or other programs that make the utilization ratio of system resources such as the CPU bus 4 high, a value "HEAVY" is registered as the load 311. More classifications than "LIGHT" and "HEAVY" can be set under the load item according to the memory access frequency at prepared basic benchmarks.

The baseline characteristics database 506 shown in FIG. 11 shows that the latency is in proportion to the distance from the CPUs 3-1 to 3-M, so that the latency is lower in access to a local memory than in access to a remote memory. The baseline characteristics database 506 also shows that the latency increases as the load becomes heavier.

(Actual Measurement Phase)

Processing executed in the actual measurement phase will be described next with reference to FIG. 12.

First, an application program to be evaluated (a business operation program, a benchmark program, or the like) is executed in the evaluation target system (Step 350).

Next, a histogram showing the memory access characteristics of the application program is created by measuring the frequency distribution of the memory latency with the performance monitor 11 while the application program is in operation (Step 351).

Lastly, the histogram created in Step 351 is compared with a histogram in the baseline characteristics database 506 to estimate the characteristics of the application program, and the estimated characteristics are displayed on the display device of the management console 16 (Step 352).

(Memory Access Characteristics Analyzing Method)

Various methods can be used to compare a histogram in the baseline characteristics database 506 with a histogram created in the actual measurement phase. Here, an example of those methods will be described.

Assume that N histograms in the baseline characteristics database 506 are a function of a memory latency l, and that the function is expressed as Hi(l) (i=1, ..., N). When a histogram created in the actual measurement phase is given as Hr(l), and Hr(l) can be approximated by the linear sum of Hi(l), the following expression is established:

$$Hr(l) \approx K1 \times H1(l) + K1 \times H2(l) + \ldots KN \times HN(l)$$

where Ki is a real number equal to or larger than 0.

It is considered that more elements in the baseline characteristics database 506 leads to more precise approximation.

An estimation can be made about whether characteristics at a basic benchmark where the value of Ki is large require a workload close to that of characteristics of the evaluation target application program.

However, in a group of elements that share the same access target 310 in the baseline characteristics database 506 of FIG. 11, other values than "0" can be set to one element at most. This means that, for example, when there are multiple candidates for the same local memory access (entries that hold "LOCAL" as the access target 310), only one of the candidates is chosen.

An example of the above estimation method example will be described with reference to FIG. 13.

Figure 13:
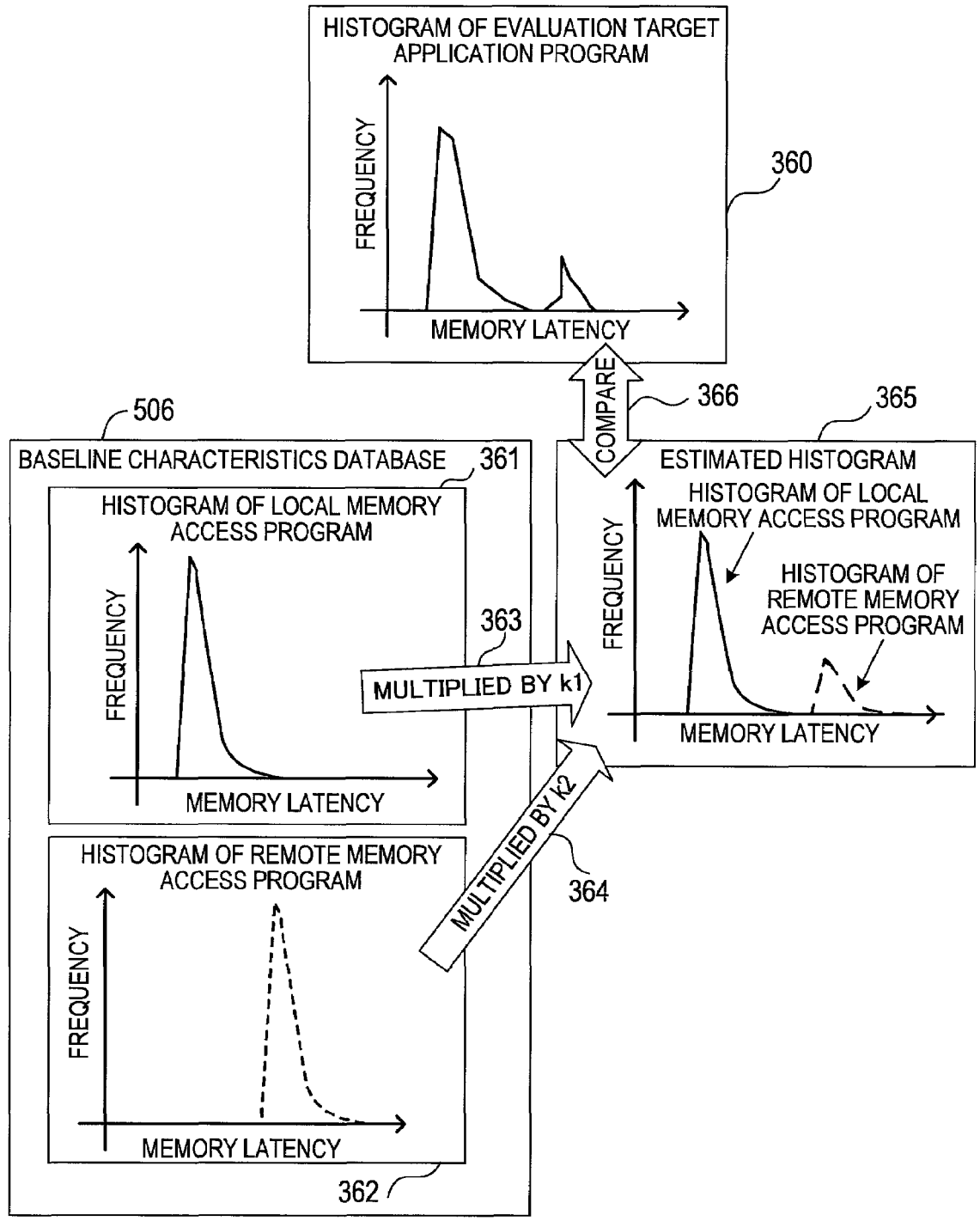
FIG. 13 shows the baseline characteristics database and a measurement result of the application program.

In FIG. 13, the baseline characteristics database 506 has a histogram 361, which shows local memory access, and a histogram 362, which shows remote memory access, and a histogram 360 of the evaluation target application program is newly obtained.

An estimated histogram 365 is created by multiplying the histogram 361 by K1, multiplying the histogram 362 by K2, and then combining the multiplied histograms 361 and 362, to be compared with the histogram 360 of the evaluation target application program (366). A given program which is run in the management console 16 is used to find K1 and K2 values that minimize the difference between the histograms 365 and 360. This is accomplished by, for example, conducting the search with the program such that the shape of a graph created by increasing the K1 value and the K2 value in minute increments Δ from 0 resembles the histogram 360 most.

Figure 14:
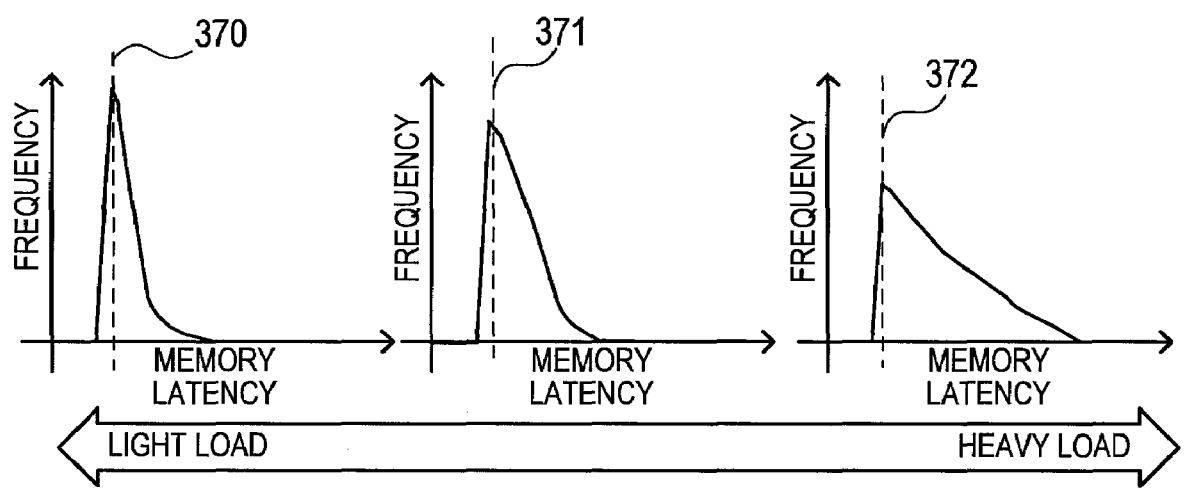
FIG. 14 is a histogram showing the relation between the memory latency and the load.

It is easily inferred from the queueing theory that the gradient of a graph showing the latency is gentler when the load on the computer system 1 (the utilization ratio of the CPU bus 4 and the like) is heavier as shown in FIG. 14. Therefore, when a drop in gradient of the graph is detected, it is presumed that the latency is prolonged due to a flood of access to a memory that corresponds to the peak of the graph (370, 371, and 372 shown in FIG. 14). In this case too, memory access characteristics can be estimated by the above-described method if such several patterns varied by differences in load as shown in FIG. 14 are prepared.

After the memory access characteristics of an application program are estimated through the method described above, a screen as the one shown in FIG. 15 is displayed on the management console 16 to provide a user with information for estimating a performance bottleneck.

Figure 15:
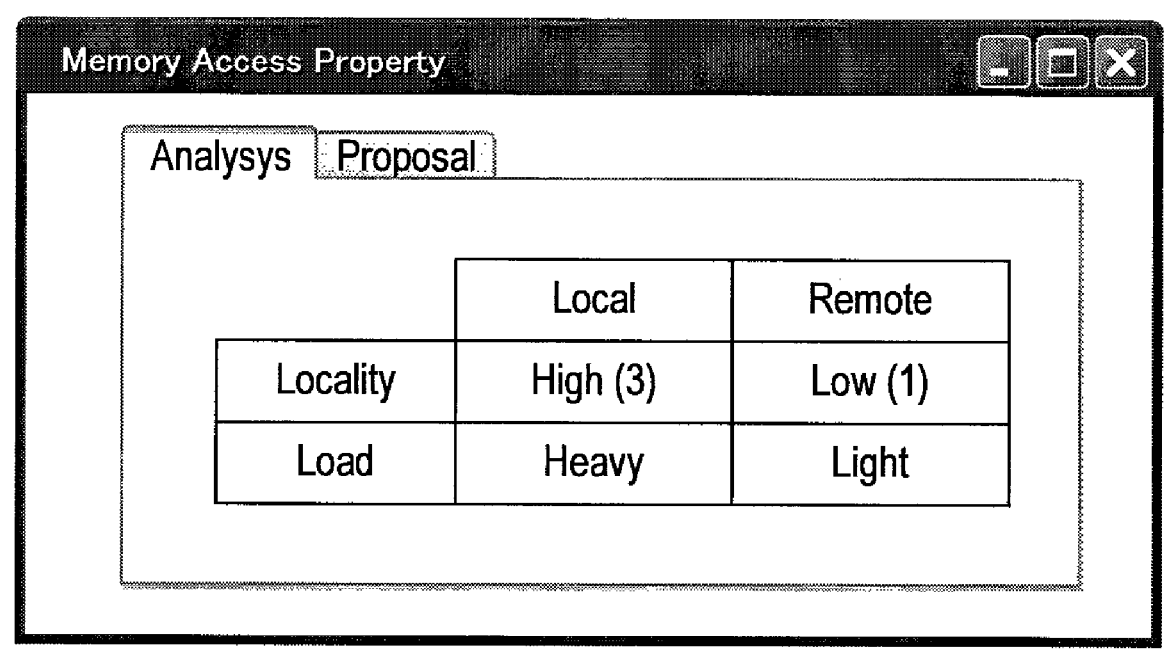

The screen in the example of FIG. 15 shows that the ratio of local memory access to remote memory access is 3:1, meaning that the local memory is accessed more than the remote memory and is flooded with access.

(Method of Suggesting a System Configuration Fit to Workload)

A description will be given below on a server configuration change assistance system for changing the configuration such that multiple nodes 2-1 to 2-N of the target computer system 1 constitute one symmetric multiple processor (SMP) server by applying the above-described method of estimating the memory access characteristics of an application program.

A.1: System Outline

Figure 16:
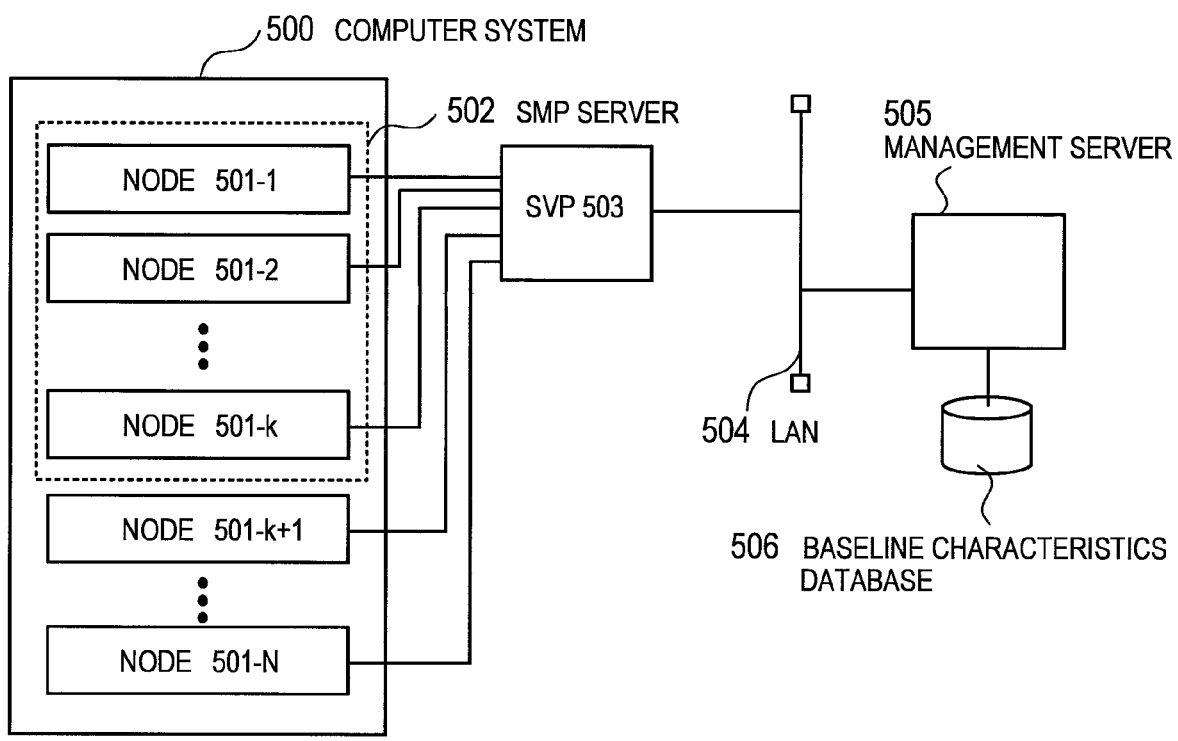
FIG. 16 is a block diagram of a computer system having a changeable node configuration.

A computer system shown in FIG. 16 is obtained by giving a changeable configuration to the computer system 1 of FIG. 1. Components common to FIGS. 1 and 16 are denoted by the same reference symbols to avoid a repetitive description.

A configuration changing system shown in FIG. 16 is composed of a computer system 500 (corresponding to the computer system 1 of FIG. 1), an SVP 503 (corresponding to the SVP 15 of FIG. 1), and a management server 505 (corresponding to the console 16 of FIG. 1). The SVP 503 and the management server 505 are connected to each other by a LAN 504. The components of the computer system 500 and the SVP 503 are the same as those of the computer system 1 and the SVP 15 shown in FIGS. 1 and 2, and therefore denoted by the same reference symbols.

The computer system 500 shown in FIG. 16 is constituted of nodes 501-1, 501-2, ..., 501-N, which are equivalent to the nodes 2-1 to 2-N in FIG. 1, and are interconnected by the crossbar switch 14 of FIG. 1. The computer system 500 activates k (1≦k≦N) nodes through the SVP 503, and is run as an SMP server 502 constituted of k nodes 501-1, 501-2, ..., 501-k.

The rest of the nodes which do not constitute the SMP server 502 may be combined to be run as another SMP server. This is called a physical partitioning mechanism, and accomplished by setting, from the SVP 503, through a configuration register (not shown) packaged in each node controller 6 shown in FIGS. 1 and 2, a node that exchanges memory access request transactions with the node controllers 6 of the nodes 501-1 to 501-k. The configuration register is a type of memory mapped register that is mapped onto the space of the main memory 5, and values can be set in the configuration register from the SVP 503 through the BMC 10.

The case of running multiple SMP servers with the use of the physical partitioning mechanism is easily understood by analogy with the case of running one SMP server. The following description therefore deals with the case of running only one SMP server 502 in the computer system 500.

The management server 505 forms a Telnet connection with the SVP 503 through a Telnet terminal emulator program or the like. A management command for changing the settings of the nodes 501-1 to 501-N is sent from the management server 505 to the SMP 503 over the Telnet connection. The management command contains a command to power on/off a server, and a configuration determining command to determine which node is to constitute an SMP, or which of the NUMA mode and the interleave mode is to be employed as the memory access mode. The management server 505 also manages the baseline characteristics database 506. The management server 505 runs a configuration change assistance program (not shown) for changing the configuration by, for example, changing the nodes in the computer system 500 or the operation mode of the computer system 500. The configuration change assistance program executes data analyzing processing necessary to provide assistance in determining which of configurations shown in FIG. 17 to choose. Described below is the operation of the configuration change assistance program executed in the management server 505 which is started by conducting a performance analysis of the computer system 500 to the SMP server 502 according to a flow chart shown in FIG. 18, and ended by presenting a system configuration suggestion to a system administrator who is operating the management server 505.

A.2: Preparation, Creation of the Baseline Characteristics Database

The system administrator examines, in advance, histograms of memory latencies measured by a benchmark program and the performance monitor 11. The system administrator examines as many histograms as the number of combinations of a node count in an SMP server as shown in FIG. 17 and a memory access mode each representing a different arrangement in the physical memory space. In the case where the influence of the latency of a DMA read instruction issued by an I/O device to read out of the main memory 5 is to be taken into account, instead of the latency of the main memory 5, a histogram of main memory read by DMA is collected. The following description, which is given with reference to a flow chart of FIG. 18, deals only with a case in which the latency of the main memory 5 is taken into consideration.

A.3: Evaluation Target System

Figure 18:
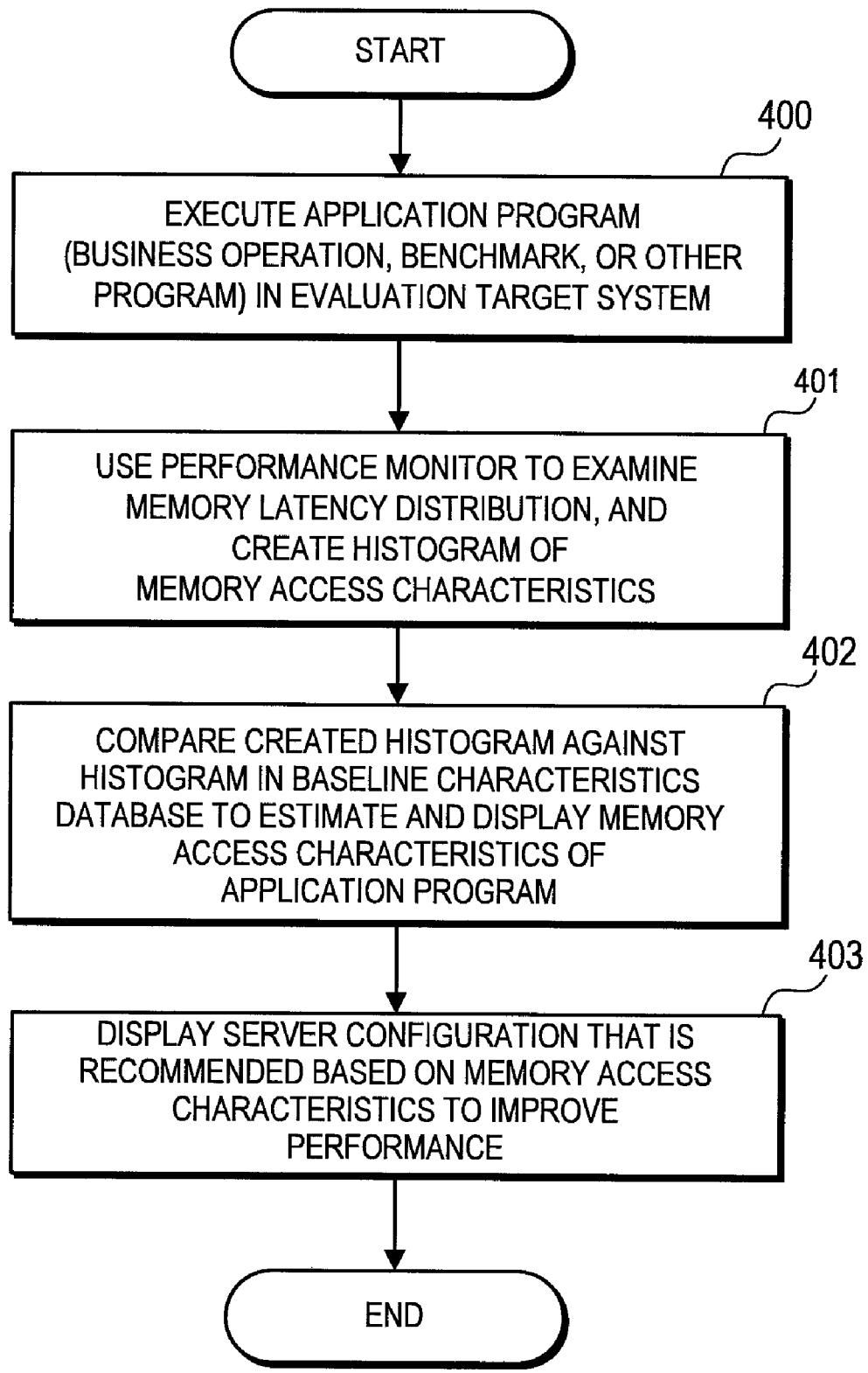
FIG. 18 is a flow chart showing an example of processing of assisting configuration change.

An application program (a business operation program, a benchmark program, or the like) is executed in the evaluation target SMP server 502 in the computer system 500 (Step 400 shown in FIG. 18).

A.4: Histogram Measurement

Next, the configuration change assistance program run in the management server 505 sends a command for operating the performance monitor 11 to the nodes 501-1 to 501-k constituting the SMP server 502 through the SVP 503, while the above application program is in operation. A memory latency histogram is thus measured.

With the operation command to operate the performance monitor 11, the type of a transaction to be collected, the start or end of measurement the performance monitor 11, and the like are set in the memory mapped register 106 of FIG. 2, the type of a transaction to be examined is set in the transaction type register 108, and a value for instructing the performance monitor 11 to start or end measurement is set in the enable register 107 or the like. Results of the measurement by the performance monitor 11 are written in the register file 118 of FIG. 2. The management server 505 writes an address set in the read address register 109 of FIG. 2 through the SVP 503, writes a read address of the register file 118, and sequentially reads, out of the frequency register 110, data that is read out of the register file 118. From the read data, the configuration change assistance program of the management server 505 creates a histogram showing memory access characteristics (Step 401 shown in FIG. 18).

For instance, when the graph shape of the histogram is planar rather than steep, high busy rate (high utilization ratio) of the main memory 5 or the CPU bus 4 is considered as one of the causes. Possible configuration change suggestions in this case are to switch the memory access mode from NUMA to the interleave mode and to disperse memory access by increasing the nodes constituting the SMP server in number. The CPU utilization ratio and other performance statistic information measured by a monitor in the OS may additionally be taken into account in making configuration change suggestions.

A.5: Analysis of Memory Access Characteristics

Figure 12:
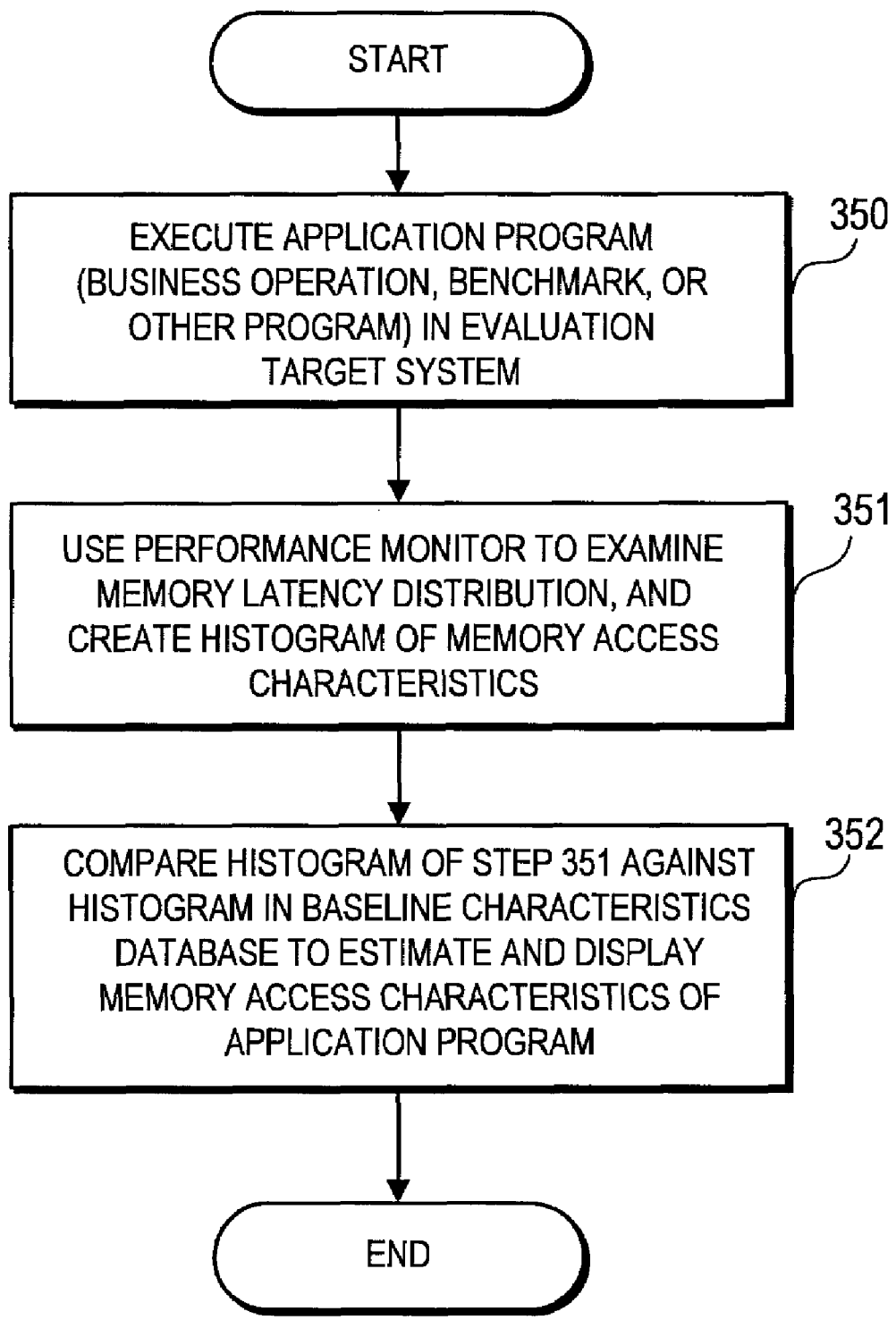
FIG. 12 is a flow chart showing steps of an actual measurement phase in which performance information of an application program executed in the computer system is measured.

Next, the histogram created in Step 401 is compared with a histogram of the baseline characteristics database to analyze the characteristics of the application program by the method described in the above-mentioned (Memory Access Characteristics Analyzing Method) with reference to FIGS. 12 and 13, in regard to which of the local node and the remote node is accessed more, whether the access frequency is high or low, and the like (Step 402 shown in FIG. 18).

A.6: Display of Suggested System Configurations

A message window shown in FIG. 15 is displayed on a display device (not shown) of the management server 505, and the memory access characteristics of the system as well, by the time the processing of Step 400 to Step 402 shown in FIG. 18 is finished. The window shown in FIG. 15 displays the local memory and remote memory access frequencies ("Locality" shown in FIG. 15) and load measurement results which are compiled by the configuration change assistance program of the management server 505 based on results of the analysis in Step 402. This example shows that the access frequency is high and the load is heavy in the local memory whereas the access frequency is low and the load is light in the remote memory.

Figure 20:
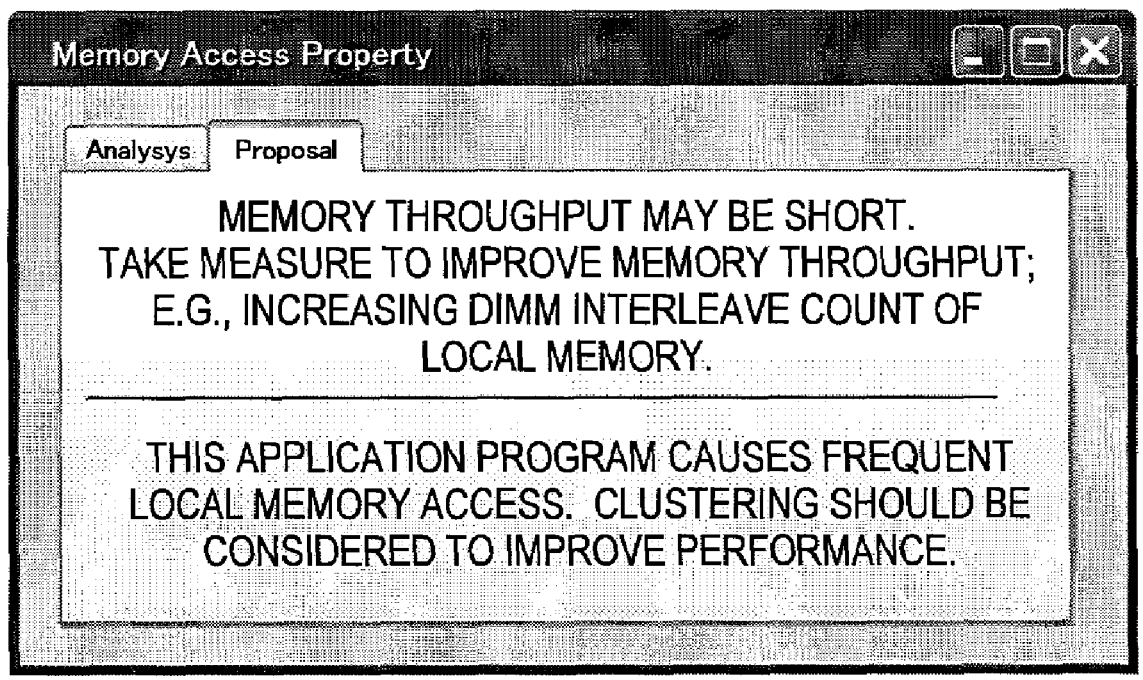
FIG. 20 shows an image of a screen on which a configuration change suggestion based on the result of measuring the memory latency is displayed by the management console.

In Step 403 of FIG. 18, an association table of FIG. 19 is searched with the memory access characteristics obtained in Step 402 as a key to select system configuration suggestions, and displays suggested system configuration changes as those shown in FIG. 20 on the display device of the management server 505. A suggested configuration change that is associated with a computer system architecture and memory access characteristics measured by the performance monitor 11 is set in the table of FIG. 19 in advance. The table of FIG. 19 is set in the management server 505 as a table preset by the configuration change assistance program, for example.

In this example where results of the measurement by the performance monitor 11 are as shown in FIG. 15 and the local memory is accessed frequently whereas the remote memory is accessed infrequently, the configuration change assistance program selects, from the table of FIG. 19, a suggested change "Increase DIMM in number to raise memory channel count. Or switch to interleave mode", which is associated with "NUMA, frequent access", and a suggested change "Switch to cluster configuration if program is compatible with cluster system", which is associated with "NUMA, local access>remote access". The suggested changes thus selected are displayed as shown in FIG. 20.

A.7: System Configuration Change

The system administrator changes the node count in a server or the memory access mode in accordance with the configuration suggestions shown in FIG. 20.

(1) An application program in the SMP server 502 is shut down and the OS is shut down.

(2) The management server 505 issues a command for changing the blade server count and a command for setting the memory access mode to the SVP 503 (the SVP 15 shown in FIG. 1). Upon input of these commands, the SVP 503 sets, through the BMC 10 of each node, in the configuration register (not shown) of the node controller 6, activation of the nodes constituting the SMP server 502, a switch to the NUMA mode, and the like.

(3) The OS is rebooted. The application program is activated. Since the CPU count and the memory capacity are now different as a result of an addition or removal of a node, the settings of the application program on the CPU count and the memory capacity are changed. The settings change may be made through manual tuning by the system administrator, or may be completed automatically by preparing different settings patterns for different hardware configurations such as the node count in advance.

In the case where the cluster configuration is recommended as a suggested change in the table of FIG. 19, the application program is run in multiple OS instances separately. The application program therefore needs to be changed to be compatible with the cluster configuration system. For example, in the case of a database management system, partitioning or the like of data in the database has to be changed. The settings of an application server, a Web server, and other components connected to the system that has changed its configuration also need to be changed.

As described above, this invention uses a histogram of the memory latency measured with hardware by the performance monitor 11 and thus a judgment can be made quickly about whether or not it is a memory or a chipset that is causing a performance bottleneck in the CPUs 3-1 to 3-M with an unchangeable internal configuration or in an application program that does not allow coding optimization.

In addition, the performance measurement does not need to use resources of the CPUs 3-1 to 3-M since the performance monitor 11 executes the performance measurement with hardware of the node controller (chipset) 6. This makes it possible to avoid applying an additional load for evaluation to a measurement target system by preventing software that collects performance information of a computer such as a server from taking a CPU time or other resources that are allocated to a measurement target application program while collecting the performance information. The performance is thus measured with high precision.

This invention also makes it possible to automatically suggest a system configuration suitable to a workload that is required by an actual application program to an administrator of the system with a measured memory latency as the reference, thereby providing assistance to the system administrator in making a decision and accomplishing a quick and effective system change. This is particularly effective in a computer system that has many nodes and many CPUs since it provides a configuration that is fit to memory access characteristics specific to an application program, thereby enabling the computer system to make most of resources.

Second Embodiment

Figure 21:
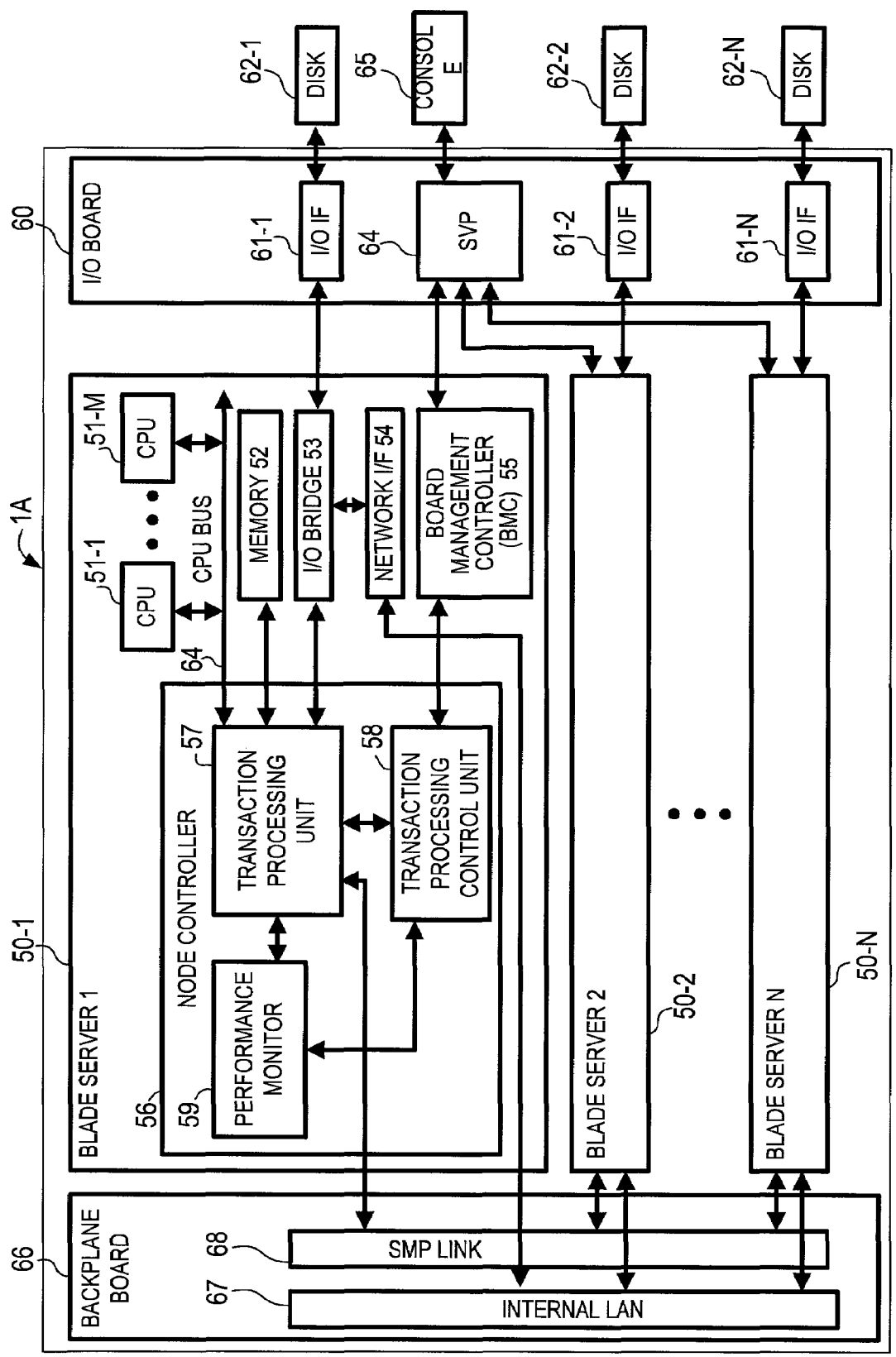
FIG. 21 is a block diagram of a computer system constituted of blade servers according to a second embodiment.

FIG. 21 shows a second embodiment in which the nodes 2-1 to 2-N of the computer system 1 of the first embodiment are replaced by blade servers 50-1 to 50-N, and a node controller 56 provided in each of the blade servers 50-1 to 50-N measures the performance. The rest of the configuration of the computer system in the second embodiment is the same as in the first embodiment.

The computer system of the first embodiment is composed of many nodes, and is partitioned physically. Described here is a contrasting example in which a small-scale computer system constitutes the base of the configuration.

FIG. 21 is a block diagram showing an example of a blade server that is equipped with a hardware monitor of this invention.

A computer system 1A has multiple blade servers 50-1, 50-2, ..., 50-N (N is an integer equal to or larger than 1), an I/O board (or I/O blade) 60, and a backplane board 66, which interconnects the blade servers 50-1 to 50-N. The computer system 1A is composed of units that are all identical. The following description on the configuration takes the blade server 50-1 as an example.

The blade server 50-1 is composed of multiple CPUs 51-1 to 51-M (M is an integer equal to or larger than 1), a main memory 52, an I/O bridge 53, a network interface 54, a chipset (hereinafter referred to as node controller) 56, and a board management controller (hereinafter abbreviated as BMC) 55.

I/O interfaces 61-1, 61-2, ..., 61-N, which are connected to disk subsystems 62-1 to 62-N, respectively, and an SVP 64 connected to a management console 65 are mounted to the I/O board 60. The I/O interfaces 61-1 to 61-N are connected to the I/O bridges 53 of the blade servers 50-1 to 50-N, respectively, to receive I/O access from the CPUs 51-1 to 51-M.

A built-in LAN 67 and an SMP link 68 are mounted to the backplane board 66. The built-in LAN 67 interconnects the blade servers 50-1 to 50-N. The SMP link 68 interconnects the node controllers 56 of the blade servers 50-1 to 50-N to build a symmetric multiple processor (SMP) server.

The I/O bridge 53 in the blade server 50-1 is connected to the I/O interface 61-1 mounted to the I/O board 60. Similarly, the I/O interfaces 61-2 to 61-N are connected to the I/O bridges (not shown) in the blade servers 50-2 to 50-N, respectively. The BMC 55 in the blade server 50-1 is connected to the SVP 64 on the I/O board 60. The BMCs (not shown) in the blade servers 50-2 to 50-N are also connected to the SVP 64. The SVP 64 is connected to the management console 65.

The I/O interfaces 61-1 to 61-N are connected to the disk subsystems 62-1 to 62-N, respectively. The disk subsystems may be replaced by networks or other I/O devices.

A transaction processing unit 57 of the node controller 56 in the blade server 50-1 is connected to the SMP link 68. Transaction processing units (not shown) of the blade servers 50-2 to 50-N are also connected to the SMP link 68.

The network interface 54 mounted in the blade server 50-1 is connected to the built-in LAN 67. The network interfaces (not shown) of the blade servers 50-2 to 50-N are also connected to the built-in LAN 67 of the computer system 1A.

The node controller 56 is composed of the transaction processing unit 57, a transaction processing control unit 58, and a performance monitor 59, which are interconnected within the node controller 56. The transaction processing control unit 58 is connected to the BMC 55.

The configurations of the CPUs 51-1 to 51-M, the main memory 52, the node controller 56, the BMC 55, and the management console 65 which constitute the computer system 1A are the same as the configurations of the CPUs 3-1 to 3-M, the main memory 5, the node controller 6, the BMC 10, and the management console 16 in the first embodiment. The performance monitor 59, the transaction processing unit 57, and the transaction processing control unit 58 included in the node controller 56 share the same configurations as the performance monitor 11, the transaction processing unit 8, and the transaction processing control unit 9 in the node controller 6 described in the first embodiment with reference to FIG. 2.

(Operation Outline)

Described below are a normal memory access operation of the CPUs 51-1 to 51-M in the blade servers 50-1 to 50-N, and access to the computer system 1A from the management console 65. Since the CPUs 51-1 to 51-M have the same configuration and operate in the same manner, the following description deals only with the CPU 51-1 and omits the rest of the CPUs.

When necessary data does not exist in a cache memory (not shown) built in the CPU 51-1, a memory access request is issued to a CPU bus 69 in order to fetch the necessary data from the main memory 52. In the case where the data requested by the CPU 51-1 is in a cache of one of the other CPUs connected to the same CPU bus 69, the data is transferred from this CPU to the CPU 51-1 via the CPU bus 69. In the case where the data is not found along the same CPU bus 69, the memory access request is issued to the transaction processing unit 57 inside the node controller 56.

The transaction processing unit 57 transfers a main memory read request to the main memory 52. Data read out of the main memory 52 is transferred to the CPU 51-1, which has sent the memory access request, through the transaction processing unit 57 and the CPU bus 69.

A system administrator issues a request to reset or boot the system, and other similar requests, to the SVP 64 from the management console 65. The SVP 64 relays these requests to the BMCs 55 in the blade servers 50-1 to 50-N to which the requests are directed. Each BMC 55 transfers the request to the transaction processing control unit 58. The transaction processing control unit 58 reads and writes data in the memory mapped register 106 shown in FIG. 2 in order to initialize, or change the operation mode of, the transaction processing unit 57 and the performance monitor 59, thereby initializing, or switching the operation mode of, the system.

The blade servers 51-1 to 51-N are run as separate servers, but blade servers in this invention can be set to operate as one computer system with a settings command sent from the SVP 64. In short, the SMP link 68 plays the role of the crossbar switch 14 of the first embodiment. Memory access operation when multiple blade servers 51-1 to 51-N are run as one symmetric multiprocessor (SMP) server is as described in the sections (Operation of Performance Monitor) and (Memory Access Characteristics Examination Method) in the first embodiment, and the description will not be repeated here.

A description will be given next with reference to FIG. 22 on a server configuration change assistance system for changing the configuration such that multiple blade servers 50-1 to 50-N in the performance measurement target computer system 1A constitute one SMP server.

B.1: System Outline

Figure 22:
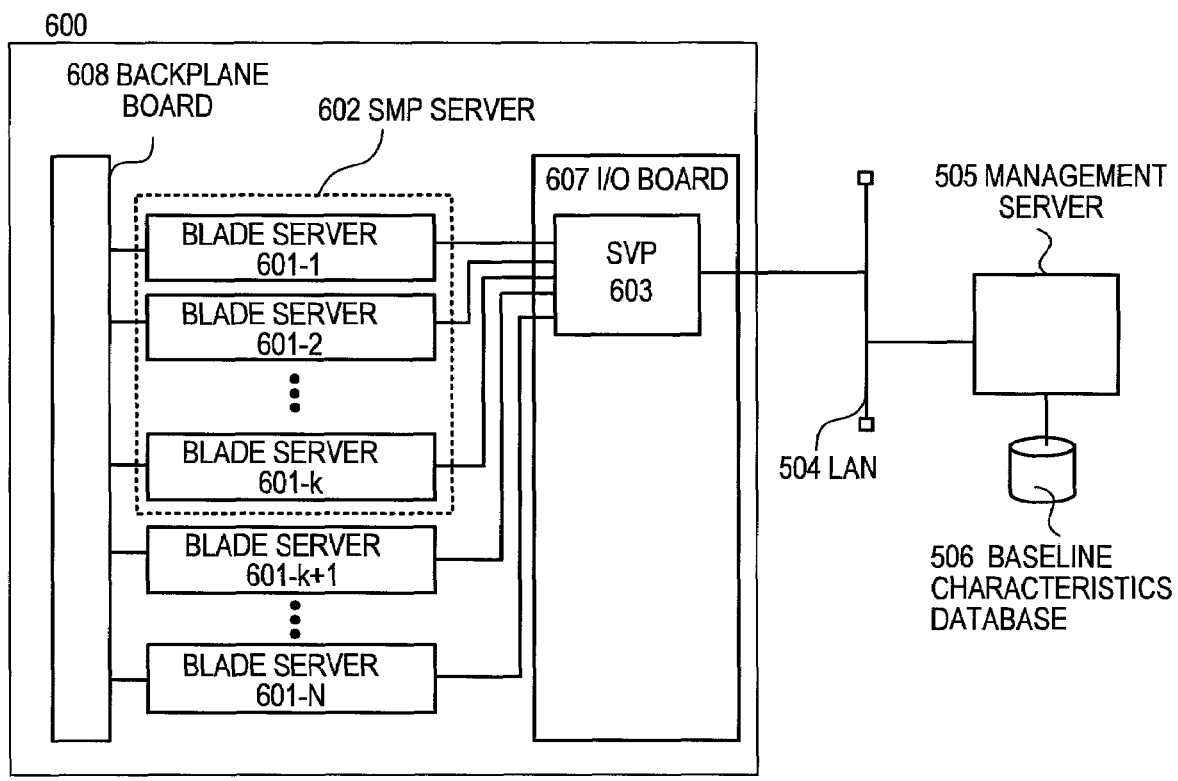
FIG. 22 is a block diagram of a computer system having a changeable node configuration according to the second embodiment.

FIG. 22 shows a configuration changing system which is obtained by giving a changeable configuration to the computer system 1A composed of the blade servers 50-1 to 50-N of FIG. 21.

A computer system 600 shown in FIG. 22 is composed of blade servers 601-1, 601-2, ..., 601-N (corresponding to the blade servers 50-1, 50-2, ..., 50-N shown in FIG. 21), an SVP 603 (corresponding to the SVP 64 shown in FIG. 21), which is mounted to an I/O board 607 (corresponding to the I/O board 60 shown in FIG. 21), and a management server 505 (corresponding to the management console 65 shown in FIG. 21). The SVP 603 and the management server 505 are connected to each other by a LAN 504. The blade servers 601-1 to 601-N are interconnected by a backplane board 608 (corresponding to the backplane board 66 shown in FIG. 21). As shown in FIG. 21, the SMP link 68 mounted to the backplane board 66 connects the blades to one another. The SMP link 68 is an internal network connecting one blade with another, and may be mounted on the substrate as wiring, or may be a crossbar switch equivalent to the crossbar switch 14 of FIG. 1.

The node controllers 56 in the blade servers 50-1 to 50-N are equipped with configuration registers (not shown), which are mapped onto the space of the main memory 52. The configuration registers are accessible to the SVP 64, and can set a blade server that exchanges memory access request transactions with the node controllers 56 in the blade servers 50-1 to 50-N. This mechanism is applied to FIG. 22 in which the blade servers 601-1 to 601-$k$ are run as one SMP server 602.

The configuration register is also used to set settings for selecting the memory access mode from the interleave mode and the NUMA mode.

The remaining blade servers, 601-$k$+1 to 601-N, may constitute another SMP server, or may be run as individual blade servers, to run multiple SMP servers. The case of running multiple SMP servers is easily understood by analogy with the case of running one SMP server 602, and the following description therefore deals with a case in which only one SMP server 602 is run.

The management server 505 forms a Telnet connection with the SVP 603 through a Telnet terminal emulator program or the like. A management command is sent from the management server 505 to the SVP 603 via the Telnet connection. The management command contains a command to power on/off a server, and a configuration determining command to determine which blade server is to be connected to the SVP, or which of the NUMA mode and the interleave mode is to be employed as the memory access mode.

Further, the management server 505 also manages the baseline characteristics database 506. The management server 505 runs a configuration change assistance program (not shown). The configuration change assistance program executes data analyzing processing necessary to provide assistance in determining which of configurations shown in FIG. 17 of the first embodiment to choose. Described below is the operation of the configuration change assistance program executed in the management server 505 which is started by conducting a performance analysis of the computer system 600 in the SMP server 602 in accordance with a flow chart shown in FIG. 18, and ended by presenting a system configuration suggestion to a system administrator who is operating the management server 505.

B.1: Preparation, Creation of the Baseline Characteristics Database

The system administrator examines, in advance, histograms of memory latencies measured by a benchmark program and the performance monitor 59 with the number of combinations of blade servers which constitutes an SMP server as shown in FIG. 17 and a memory access mode each representing a different arrangement in the physical memory space. In the case where the influence of the latency of a DMA read main memory issued by an I/O device to read out of the main memory 52 is to be taken into account, instead of the latency of the main memory 52, a histogram of main memory read by DMA is collected. The following description, which is given with reference to a flow chart of FIG. 18 represented in the first embodiment, deals only with a case in which the latency of the main memory 52 is taken into consideration.

B.2: Evaluation Target System

An application program (a business operation program, a benchmark program, or the like) is executed in the evaluation target SMP server 602 (Step 400 shown in FIG. 18).

B.3: Histogram Measurement

Next, the configuration change assistance program run in the management server 505 sends a command for operating the performance monitor 59 of FIG. 21 to the blades 601-1 to 601-k constituting the SMP server 602 while the above application program is in operation. A memory latency histogram is thus measured.

With the operation command to set the performance monitor 59, the type of a transaction to be collected, the start or end of measurement the performance monitor 59, and the like are set in the memory mapped register 106 of FIG. 2, the type of a transaction to be examined is set in the transaction type register 108, and a value for instructing the performance monitor 59 to start or end measurement is set in the enable register 107 or the like. Results of the measurement by the performance monitor 59 are written in the register file 118 of FIG. 2. The management server 505 writes an address set in the read address register 109 of FIG. 2 through the SVP 603, writes a read address of the register file 118, and sequentially reads, out of the frequency register 110, data that is read out of the register file 118. The configuration change assistance program of the management server 505 creates a histogram showing memory access characteristics (Step 401 shown in FIG. 18).

B.4: Analysis of Memory Access Characteristics

Next, the histogram created in Step 401 is compared with a histogram in the baseline characteristics database to analyze the characteristics of the application program by the method described in the above section (Memory Access Characteristics Analyzing Method) with reference to FIGS. 12 and 13 of the first embodiment, in regard to which of the local node and the remote node is accessed more, whether the access frequency is high or low, and the like (Step 402 shown in FIG. 18).

For instance, when the graph shape of the histogram is planar rather than steep, high busy rate of the main memory or the CPU bus is considered as one of the causes. Possible configuration change suggestions in this case are to switch the memory access mode from NUMA to the interleave mode and to disperse memory access by increasing the blades count constituting the SMP server 602. The CPU utilization ratio and other performance statistic information measured by a monitor in the OS may additionally be taken into account in making configuration change suggestions.

B.5: Display of Suggested System Configurations

A message shown in FIG. 15 which is the same as the one shown in the first embodiment is displayed as well as the memory access characteristics of the system, by the time the processing of Step 400 to Step 402 shown in FIG. 18 is finished.

In Step 403, an association table of FIG. 19 is searched with the memory access characteristics obtained in the Step 402 to select system configuration suggestions, and displays suggested system configuration changes as those shown in FIG. 20 as described in the first embodiment on the display device of the management server 505.

B.6: System Configuration Change

The system administrator changes the blades count in a server or the memory access mode in accordance with the configuration suggestions shown in FIG. 20.

(1) An application program in the SMP server 602 is shut down and the OS is shut down.

(2) The management server 505 issues a command for changing the node count and a command for setting the memory access mode to the SVP 603 (the SVP 15 shown in FIG. 1). Upon input of these commands, the SVP 15 sets, through the BMC 10 of each node, in the configuration register (not shown) of the node controller 6, activation of the nodes constituting the SMP server 602, a switch to the NUMA mode, and the like.

(3) The OS is rebooted. The application program is activated. Since the CPU count and the memory capacity are now different as a result of an addition or removal of a node, the settings of the application program about the CPU count and the memory capacity are changed. The settings change may be made through manual tuning by the system administrator, or may be completed automatically by preparing different settings patterns for different hardware configurations such as the node count in advance. In the case where the cluster configuration in the table of FIG. 19 which holds suggested changes is recommended, the application program therefore needs to be changed to be compatible with the cluster configuration system. For example, in the case of a database management system, the partitioning of data in the database and the settings of a connected application server and Web server connected to the system may also be changed.

Third Embodiment

Figure 23:
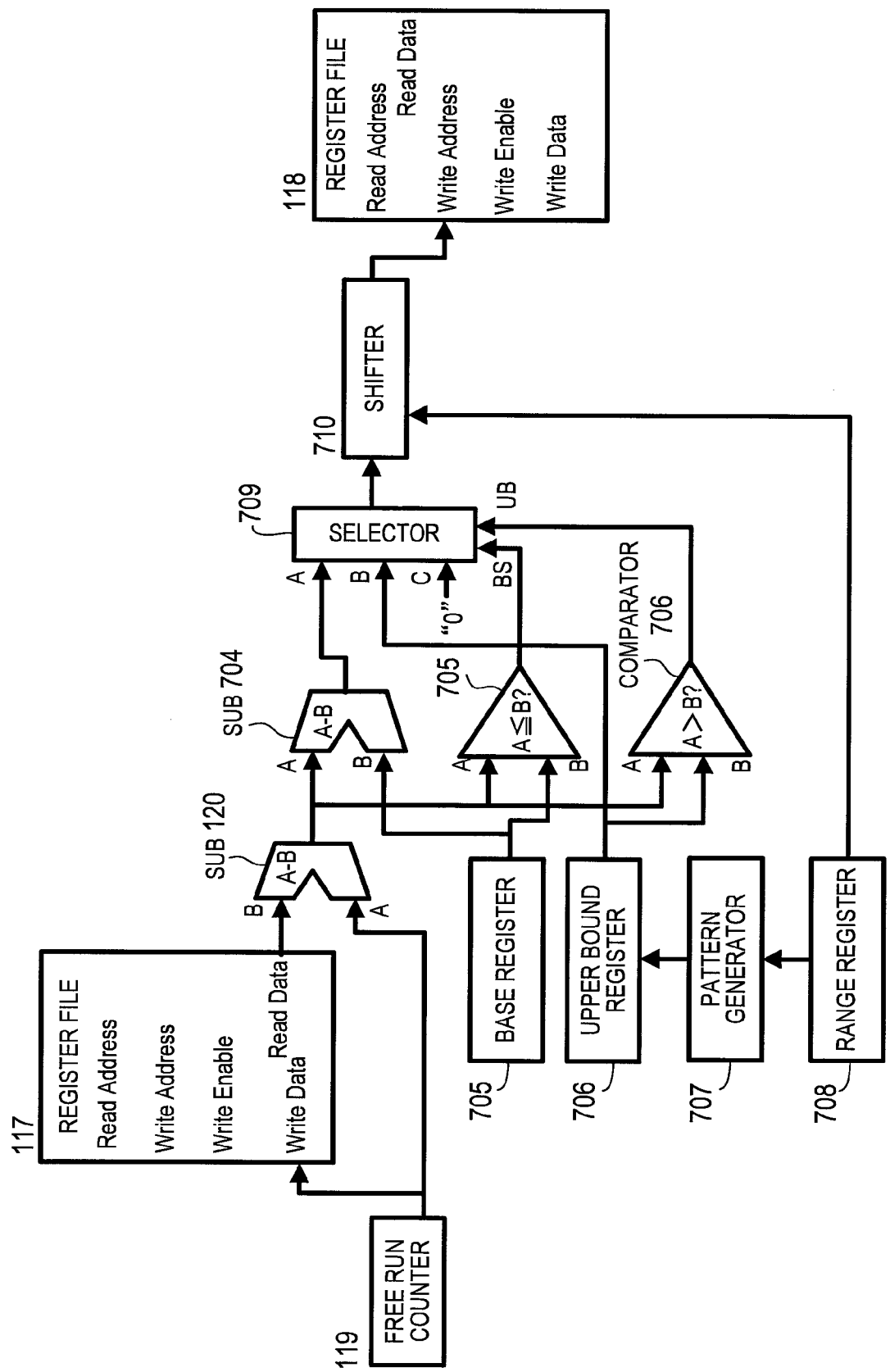
FIG. 23 is a block diagram showing a part of a node controller according to a third embodiment.

FIG. 23 shows a third embodiment in which the degree of freedom in the latency measurement performed by the performance monitor 11 shown in FIG. 2 is increased by setting the range and interval of measured latencies arbitrarily.

Adding a circuit shown in FIG. 23 to the performance monitor 11 described in the first embodiment with reference to FIG. 2 makes it possible to set the range and interval of measured latencies and enhance the degree of freedom in the latency measurement. FIG. 23 shows only a part of the performance monitor 11 where the register file 117, the register file 118, and the components in between are located. The rest of the configuration shown in FIG. 23 is the same as the one described in the first embodiment with reference to FIG. 2. Also, components common to FIG. 2 which illustrates the first embodiment are denoted by the same reference symbols.

(1) Circuit Outline

The outline of the circuit shown in FIG. 23 will be described. Read data of the register file 117 and an output of the free-run counter 119 are input to the subtracter 120. An output of the subtracter 120 (=the value of the free-run counter 119–the read data of the register file 117) is output to a subtracter 704.

Further, a base register 705 and a measurement range register 708 are added as memory mapped registers. The value of the base register 705 is input to the subtracter 704 and a comparator 705. The subtracter 704 outputs a value obtained by subtracting the value of the base register 705 from the output value of the subtracter 120. The comparator 705 outputs "1" when the value of the base register 705 is equal to or larger than the output value of the subtracter 120, otherwise, outputs "0".

The value of the measurement range register 708 is input to a shifter 710 and a pattern generator 707. The pattern generator 707 creates an upper bound value based on the relation between the shift width "bit" and the upper bound value in a table shown in FIG. 24. An upper bound value created by the pattern generator 707 is stored in an upper bound register 706. The value of the upper bound register 706 is input to a selector 709 and a comparator 706. The comparator 706 outputs "1" when the output value of the subtracter 120 is larger than the value of the upper bound register 706, otherwise, outputs "0".

The subtracter 704, the comparator 705, and an all-"0" value are input to the selector 709. One of the three inputs is selected based on the input pattern of the comparator 705 and the comparator 706, to be input to the shifter 710. The shifter 710 is shifted to the right by a shift width as shown in FIG. 24 stored in the measurement range register 708, and input to the write address input of the register file 118.

Figure 25:
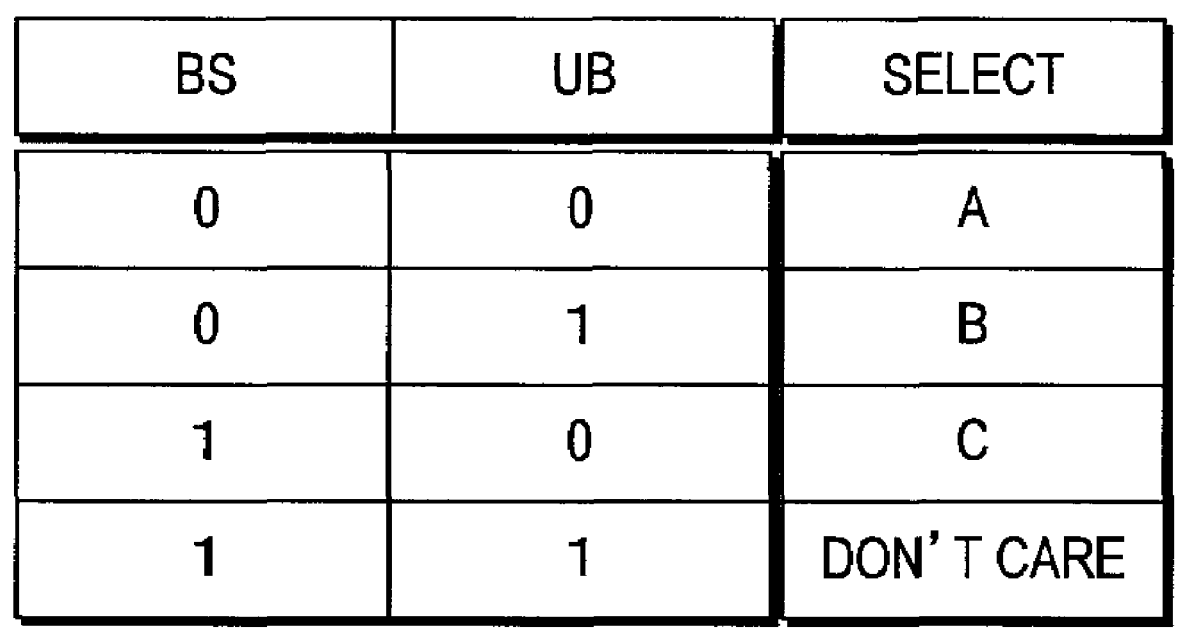

The selector 709 selects input signals in accordance with the truth table shown in FIG. 25. In FIG. 25, BS indicates an output of the comparator 705 and UB indicates an output of the comparator 706. The selector 709 selects signals from terminals registered in the "SELECT" field shown in FIG. 25 based on the values of BS and US. In the case of a terminal "A", the output of the subtracter 704 is chosen, in the case of "B", the value of the upper bound register 706 is chosen and, in the case of "C", a fixed value "0" is chosen.

Figure 26:
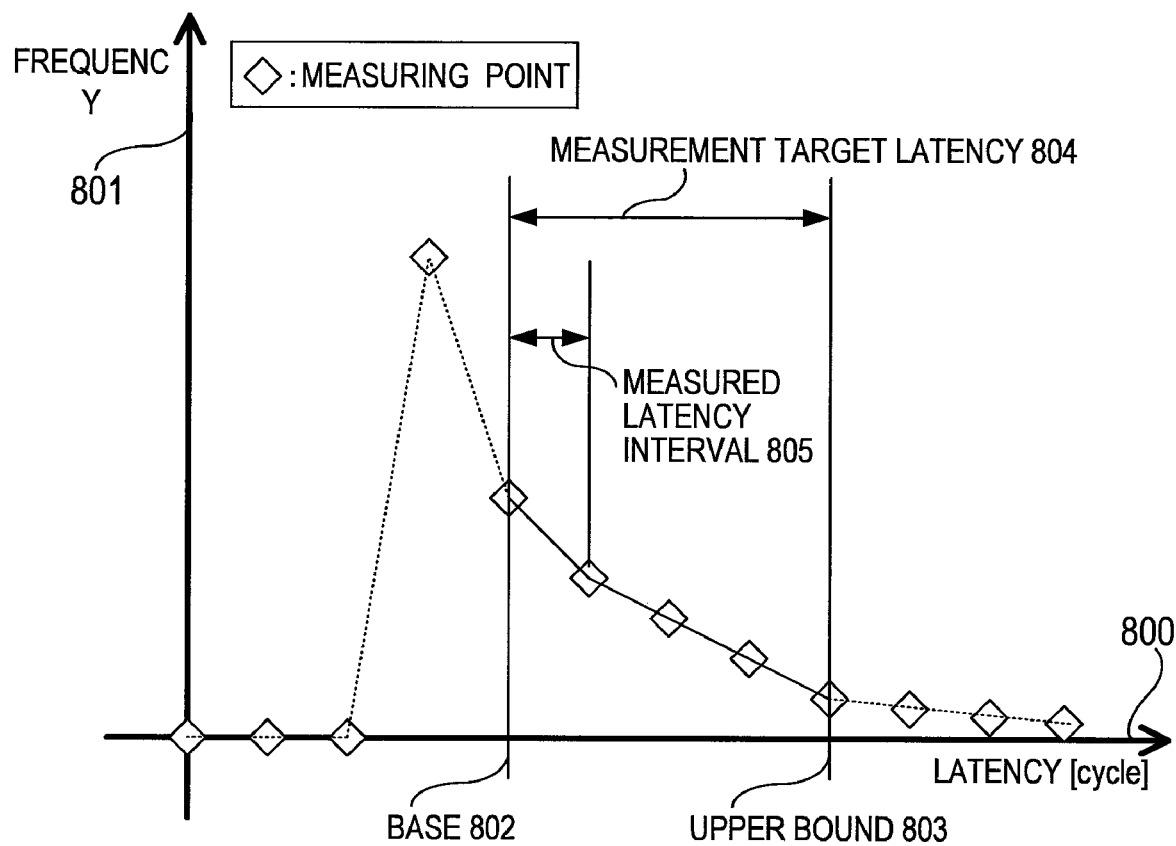
FIG. 26 is a histogram showing the relation between the memory latency and the load according to the third embodiment.

An example of a histogram measured by the above circuit is shown in FIG. 26. An axis of abscissa 800 shown in FIG. 26 shows the length of the memory latency in, for example, cycle count measured with the operating clock frequency of the performance monitor 11. An axis of ordinate 801 shows the frequency of appearance of each latency in, for example, memory access transaction count. A base 802 represents a value stored in the base register 705, and an upper bound 805 represents a value stored in the upper bound register 706. A measurement target latency 804 ranges from the base 802 to the upper bound 803. A measured latency interval 805 is obtained from values stored in the measurement range register 708.

(2) Operation Example of the Added Circuit
(2-1) Changing Measuring Range

FIG. 24 shows the relation between the measurable latency observation range and shift width. The measurable latency width can be changed by using the shifter 710 to shift the memory latency data to the right, which is an output of the subtracter 120. For instance, when the register file 118 has 128 entries, a latency of 0 cycle to 127 cycles can be measured.

With a shift to the right by 1 bit, the width of the latency stored in one entry is widened to a 2-cycles' width (see the measurement range column shown in FIG. 24), and a latency of 0 cycle to 255 cycles can be measured as a whole. With a shift to the right by 2 bits, the width of the latency stored in one entry is widened to a 4-cycles' width (see the measurement range column shown in FIG. 24), and a latency of 0 cycle to 255 cycles can be measured as a whole. How far to the right in bit count a shift is to be made is set in the measurement range register 708.

To count the number of latencies that exceed the maximum value of the observation range, a latency that exceeds an upper bound value in each range shown in FIG. 24 may be counted as the value of an entry that has the maximum observation range value. For instance, when the shift width is 0 bit, any latency that is equal to or more than 128 cycles is counted as a latency of 127 cycles. This can be accomplished by adding the comparator 706 and setting the selector 710 such that inputs are selected in the manner shown in FIG. 25.

(2-2) Changing Observation Range

The minimum value of the observation range does not always need to be set to 0 cycle, and may be set to a specific cycle count (hereinafter referred to as base cycle count). The base cycle count is set in the base register 705 before the latency measurement is started, the other subtracter 704 is connected to the output of the subtracter 120 to obtain the difference between the base cycle count and the latency, and the difference is used to change the cycle count of the measurement target latency. For example, when the base cycle count (=the value of the base register 705) is set to 255, the observation range can be changed from a range between 0 cycle and 255 cycles to a range between 255 cycles and 511 cycles. To count the number of latencies that are equal to or less than 254 cycles in this case, any latency that is smaller than the value of the base register 705 is counted as a latency of 255 cycles in the manner described in the section (2-1). This is accomplished by adding the comparator 705 and setting the selector 710 such that inputs are selected in the manner shown in FIG. 25.

By thus selecting arbitrarily the range of latencies to be measured and the interval of latencies, performance measurement targets can be narrowed down. For example, the measurement may be focused on the latency of the local memory, or on the latency of the remote memory.

The embodiments described above show an example in which the performance monitor 11 is placed in the node controller 6 or 56, which connects the CPU bus 4 and the memory channel (memory bus) 124, but this invention is not limited thereto. For instance, the performance monitor 11 of this invention can be placed in a memory controller when a processor employed has a CPU and a memory controller that are integrated into one.

(Supplement)

A controller including:
CPU; and
a controller connecting at least one CPU to a memory and to an I/O interface is characterized by including:
wherein the controller includes:
a response time measuring unit for receiving a request to access the memory and measuring a response time taken to respond to the memory access request;
a frequency counting unit for measuring an issue count of the memory access request;
a measurement result storing unit for storing a measurement result associating the response time with the issue count; and
a measurement result control unit for outputting the measurement result from the measurement result storing unit when receiving a request to read the measurement result.

A controller connecting at least one CPU to a memory is characterized by including:
a response time measuring unit for receiving a request to access the memory and measuring a response time taken to respond to the memory access request;
a frequency counting unit for measuring an issue count of the memory access request;
a measurement result storing unit for storing a measurement result associating the response time with the issue count; and
a measurement result control unit for outputting the measurement result from the measurement result storing unit when receiving a request to read the measurement result.

As has been described, this invention is applicable to a computer system that needs to obtain performance information, and is particularly suitable to a cluster server or a blade server that is capable of changing the node or server blade configuration in accordance with the obtained performance information. This invention is also applicable to a controller that connects a CPU and a memory to each other.

What is claimed is:

1. A computer system comprising:
   at least one CPU; and
   a controller for connecting the CPU to a memory and to an I/O interface,
   wherein the controller includes:
      a response time measuring unit for receiving a request to access the memory and measuring a response time taken to respond to the memory access request;
      a frequency counting unit for measuring an issue count of the memory access request;
      a measurement result storing unit for storing a measurement result associating the response time with the corresponding issue count; and
      a measurement result control unit for outputting the measurement result from the measurement result storing unit when receiving a request to read the measurement result,
   wherein the measurement result control unit is connected to a management terminal which sends a measurement result read request, and, upon receiving the read request, sends the measurement result to the management terminal.

2. The computer performance system according to claim 1, wherein the response time measuring unit includes:
   a measurement range setting unit for setting a measurement range of the response time; and
   a measurement interval setting unit for setting an interval of the measured response time.

3. The computer system according to claim 1, wherein the management terminal estimates memory access characteristics from the memory access request response time and a memory access request issue count that is associated with the response time, based on the measurement result obtained from the measurement result control unit.

4. A computer performance evaluation system, comprising:
   a computer having at least one CPU and a controller, which connects the CPU to a memory and to an I/O interface; and
   a management terminal connected to the computer,
   wherein the controller includes:
      a response time measuring unit for receiving a request to access the memory and measuring a response time taken to respond to the memory access request;
      a frequency counting unit for measuring an issue count of the memory access request;
      a measurement result storing unit for storing a measurement result associating the response time with the corresponding issue count; and
      a measurement result control unit for receiving a measurement result read request from the management terminal, and outputting the measurement result from the measurement result storing unit to the management terminal, and
   wherein the management terminal has a performance estimating unit for estimating memory access characteristics from the memory access request response time and a memory access request issue count that is associated with this response time, based on the measurement result obtained from the measurement result control unit.

5. The computer performance evaluation system according to claim 4, wherein the memory access request comprises a memory access request that is issued by the CPU.

6. The computer performance evaluation system according to claim 4,
   wherein the I/O interface contains a DMA control unit, which accesses the memory, and
   wherein the memory access request is a memory access request that is issued by the I/O interface.

7. The computer performance evaluation system according to claim 4,
   wherein the response time measuring unit includes:
      a measurement range setting unit for setting a measurement range of the response time; and
      a measurement interval setting unit for setting an interval of the measured response time; and
   wherein the management terminal has a measurement condition setting unit for sending a response time measurement range to the measurement range setting unit and sending a response time measurement interval to the measurement interval setting unit.

8. The computer performance evaluation system according to claim 4, wherein the performance estimating unit estimates, from the memory access request response time and a memory access request issue count that is associated with this response time, based on the measurement result obtained from the measurement result control unit, a physical location of the memory to which the memory access request is directed.

9. The computer performance evaluation system according to claim 4,
   wherein the computer includes:
      multiple nodes each of which contains at least one CPU and a controller, the controller connecting the CPU to a memory and to an I/O interface;
      a communication unit for interconnecting the multiple nodes; and
      a physical partitioning unit for selecting some of the multiple nodes in advance to have the selected nodes execute the same processing together, and
   wherein the management terminal has a configuration assistance unit which outputs, based on the memory access characteristics estimated by the performance estimating unit, a configuration of the nodes in the computer that makes the response time shorter.

10. A method of evaluating computer performance by a management terminal which is connected to a computer, the computer having at least one CPU and a controller, the controller connecting the CPU to a memory and to an I/O interface, comprising the steps of:
    executing an application program in the computer;
    measuring, when the controller receives a request to access the memory, a response time taken to respond to the memory access request;
    measuring, by the controller, an issue count of the memory access request;
    storing a measurement result in which the response time is associated with the issue count;
    sending, when a measurement result read request is received from the management terminal after the execution of the application program is finished, the stored measurement result to the management terminal; and
    estimating, by the management terminal, memory access characteristics of the application program from the memory access request response time and a memory access request issue count that is associated with this response time, based on the measurement result obtained from the controller.

11. The method of evaluating computer performance according to claim 10, wherein the step of estimating the memory access characteristics includes estimating a physical location of the memory to which the memory access request is directed from the memory access request response time and a memory access request issue count that is associated with the response time, based on the measurement result.

12. The method of evaluating computer performance according to claim 2,
    wherein the computer includes:
        multiple nodes each of which contains at least one CPU and a controller, the controller connecting the CPU to a memory and to an I/O interface;
        a communication unit for interconnecting the multiple nodes; and
        a physical partitioning unit for selecting some of the multiple nodes in advance to have the selected nodes execute the same processing together; and
    wherein the method further comprises the step of outputting, based on the memory access characteristics which are estimated in the estimation step, a configuration of the nodes in the computer that makes the response time shorter.

* * * * *